United States Patent
Tobia et al.

(10) Patent No.: US 11,554,552 B2
(45) Date of Patent: Jan. 17, 2023

(54) METHOD FOR FORMING 3D PRINTED OBJECTS WITH MULTI-LAYER RAFTS WHICH OPTIMIZE SHRINKAGE

(71) Applicant: Desktop Metal, Inc., Burlington, MA (US)

(72) Inventors: Jay Tobia, Somerville, MA (US); Aaron M. Preston, Arlington, MA (US); Alexander C. Barbati, Melrose, MA (US)

(73) Assignee: Desktop Metal, Inc., Burlington, MA (US)

(*) Notice: Subject to any disclaimer, the term of this patent is extended or adjusted under 35 U.S.C. 154(b) by 0 days.

(21) Appl. No.: 17/018,466

(22) Filed: Sep. 11, 2020

(65) Prior Publication Data

US 2021/0078259 A1 Mar. 18, 2021

Related U.S. Application Data

(60) Provisional application No. 62/899,809, filed on Sep. 13, 2019.

(51) Int. Cl.
| | |
|---|---|
| *B29C 64/40* | (2017.01) |
| *B29C 64/209* | (2017.01) |
| *B29C 64/393* | (2017.01) |
| *B28B 1/00* | (2006.01) |
| *B29C 64/236* | (2017.01) |
| *B33Y 70/00* | (2020.01) |
| *B33Y 10/00* | (2015.01) |
| *B33Y 50/02* | (2015.01) |

(52) U.S. Cl.
CPC ............. *B29C 64/40* (2017.08); *B28B 1/001* (2013.01); *B29C 64/209* (2017.08); *B29C 64/236* (2017.08); *B29C 64/393* (2017.08); *B33Y 10/00* (2014.12); *B33Y 50/02* (2014.12); *B33Y 70/00* (2014.12)

(58) Field of Classification Search
None
See application file for complete search history.

(56) References Cited

U.S. PATENT DOCUMENTS

| | | | |
|---|---|---|---|
| 2016/0136903 A1* | 5/2016 | Herran | B29C 64/40 264/308 |
| 2016/0236416 A1* | 8/2016 | Bheda | B33Y 50/02 |
| 2017/0251713 A1* | 9/2017 | Warner | A23P 30/20 |

FOREIGN PATENT DOCUMENTS

| | | | | |
|---|---|---|---|---|
| CA | 3040921 A1 | * | 6/2018 | ............ B22F 3/1025 |
| EP | 3412431 A1 | * | 12/2018 | ........... B29C 64/245 |

* cited by examiner

*Primary Examiner* — Joseph S Del Sole
*Assistant Examiner* — Guy F Mongelli
(74) *Attorney, Agent, or Firm* — Oak Law, PLLC; Jonathan D. Hall

(57) ABSTRACT

Systems and methods for forming an object using additive manufacturing. One method includes receiving a digital model of the object, predicting a shrinking characteristic or receiving a predicted shrinking characteristic of the object that will occur during thermal processing of the object, once formed, and generating, based on the shrinking characteristic of the object, instructions for forming a raft on which the object will be formed. The instructions for forming the raft are configured to form a raft having a shrinking characteristic that reflects the shrinking characteristic of the object.

4 Claims, 22 Drawing Sheets

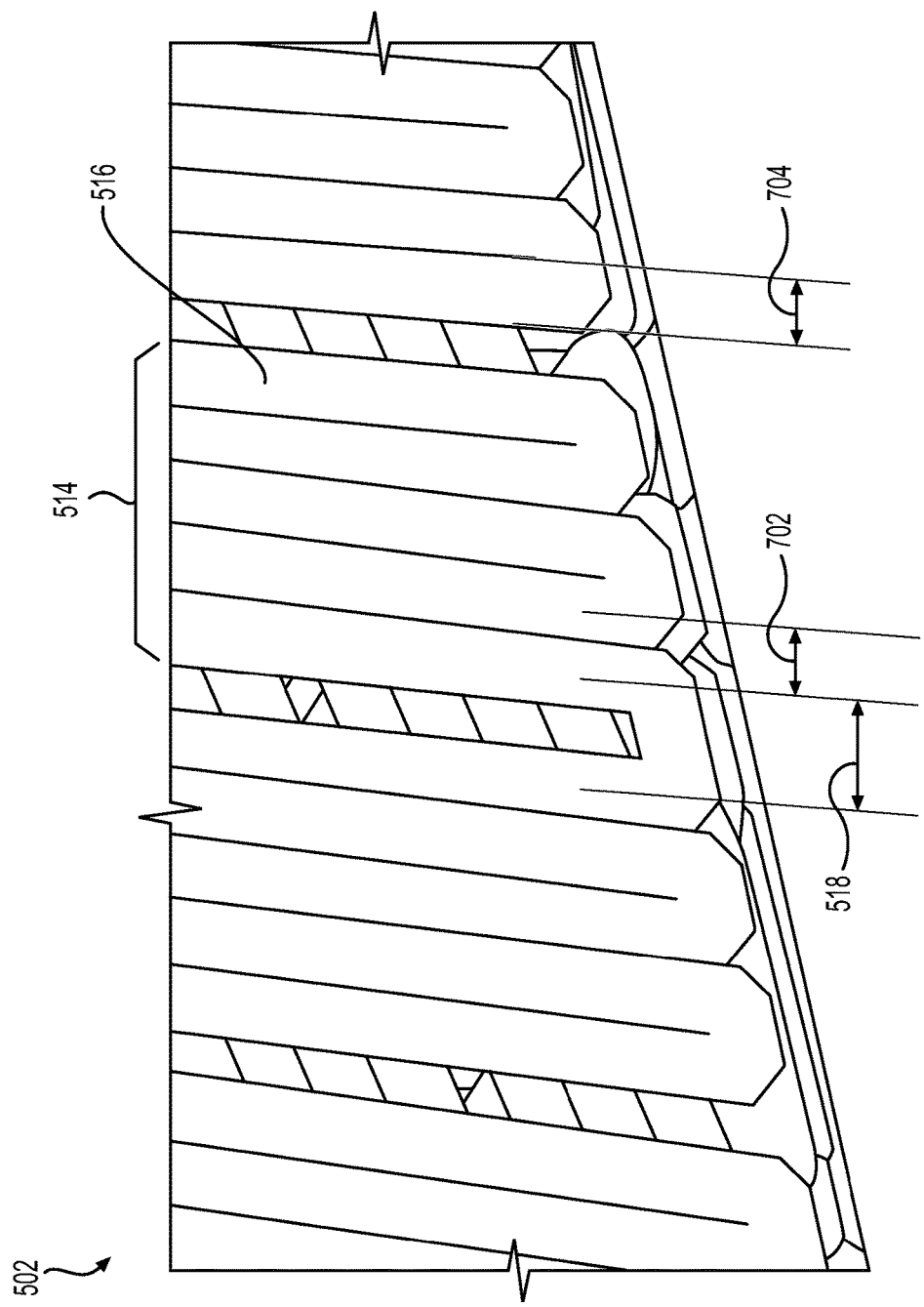

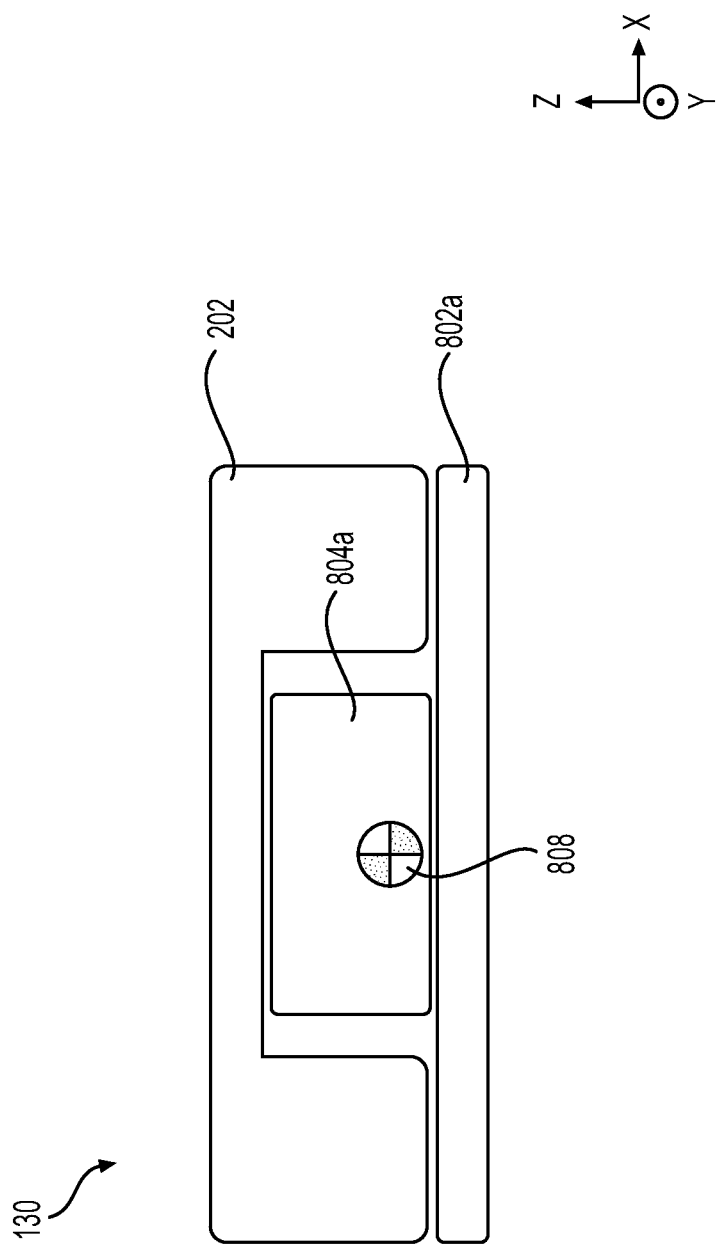

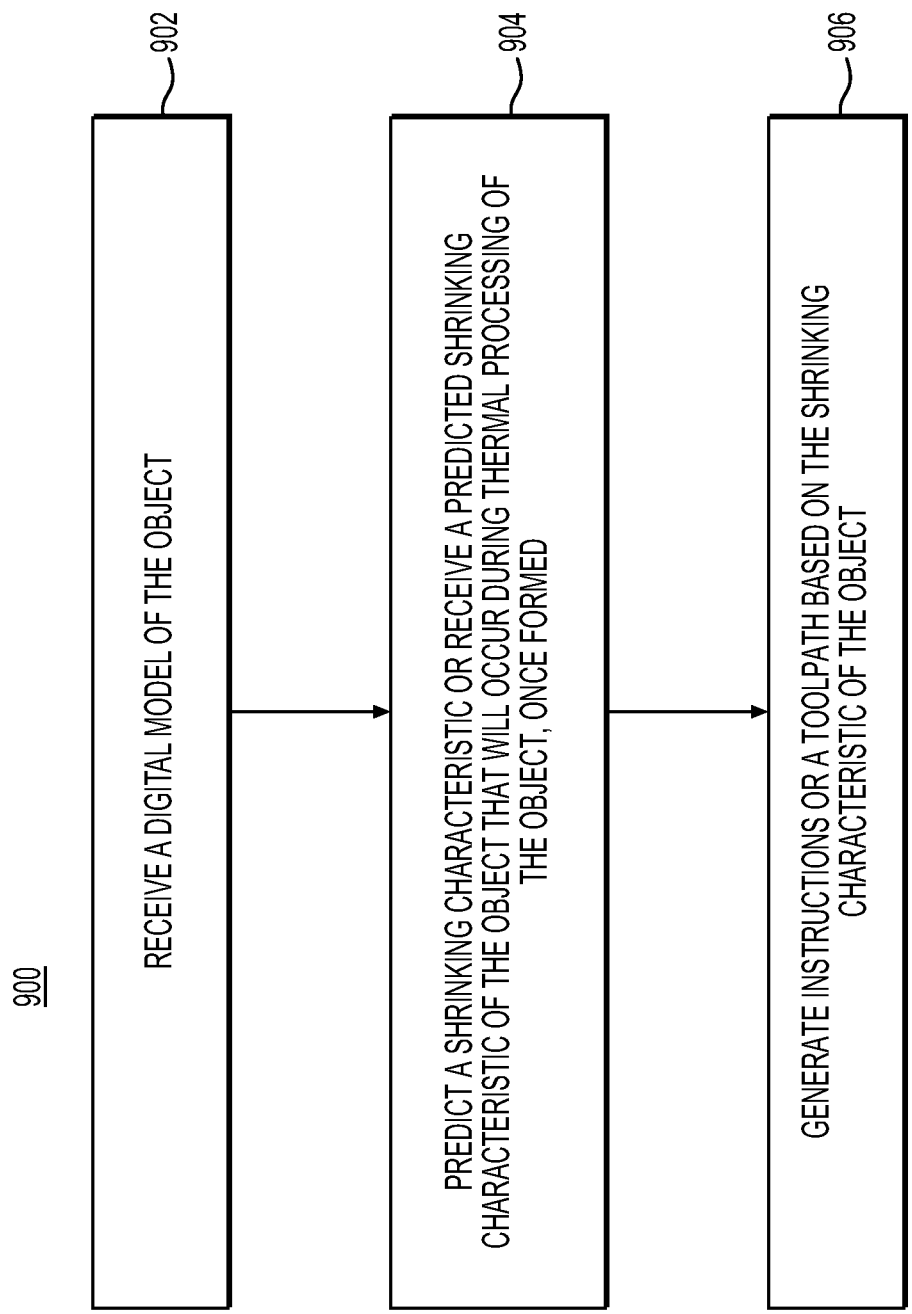

METHOD FOR FORMING 3D PRINTED OBJECTS WITH MULTI-LAYER RAFTS WHICH OPTIMIZE SHRINKAGE

RELATED APPLICATION

This application claims the benefit of U.S. Provisional Application No. 62/899,809, filed on Sep. 13, 2019. The entire teachings of the above application are incorporated herein by reference.

TECHNICAL FIELD

Various aspects of the present disclosure relate generally to systems and methods for forming contracting build supports, for example, build supports used in additive manufacturing.

BACKGROUND

Metal injection molding (MIM) is a metalworking process useful in creating a variety of metal objects. A mixture of powdered metal and one or more binders (e.g., a polymer such as polypropylene or wax) may form a "feedstock" capable of being molded, when heated, into the shape of a desired object. The initial molded part, also referred to as a "green part," may then undergo a preliminary debinding process (e.g., chemical debinding or thermal debinding) to remove primary binder while leaving secondary binder intact, followed by a sintering process. During sintering, the part may be heated to vaporize and remove the secondary binder (thermal debinding) and brought to a temperature near the melting point of the powdered metal, which may cause the metal powder to densify into a solid mass (hereinafter referred to as a densifying process), thereby producing the desired metal object.

Additive manufacturing, which includes three-dimensional (3D) printing, includes a variety of techniques for manufacturing a three-dimensional object via a process of forming successive layers of the object. Three-dimensional printers may in some embodiments utilize a feedstock comparable to that used in MIM, thereby creating a green part without the need for a mold. The printed green part may then undergo debinding and sintering processes to produce the object.

Parts may crack during thermal processing (e.g., thermal debinding process or densifying process). Part cracking during thermal processing may be due to one or more of: (1) non-uniform shrinkage; (2) constrained thermal processing; or (3) incomplete chemical debind. In some instances, part cracking due to non-uniform shrinkage may be caused by differences in powder size/agglomerates, temperature, and/or chemistry. Part cracking due to constrained thermal processing may be caused by friction or inclusions. Part cracking due to incomplete chemical debind may be caused by outgassing of remaining binder material during thermal processing, which may result in various stresses that may crack and/or break the part.

The systems and methods of the current disclosure may rectify one or more of the deficiencies described above, and/or address other aspects of the prior art. Specifically, some embodiments disclosed herein may provide an improved support structure to prevent or reduce cracking during a thermal processing.

SUMMARY

Examples of the present disclosure relate to, among other things, systems and methods for generating contracting build supports for an object formed by additive manufacturing (hereinafter collectively referred to as a "printed object"). In some instances, the printed object may include a part (i.e., the desired metal part) and a build support. That is, additive manufacturing may be utilized to form the part itself, as well as the build support. The build support may include one or more support structures and a raft. In some embodiments, the one or more support structures may be configured to uphold a portion of the part (e.g., an overhanging portion of the part) during an additive manufacturing process. In some embodiments, the raft may act as a base for the printed object on which the part and the one or more support structures are positioned. According to some embodiments of the current disclosure, the part and the build supports may shrink more uniformly, thereby decreasing a tendency for the printed object to crack during thermal processing. Each of the examples disclosed herein may include one or more of the features described in connection with any of the other disclosed examples.

The present disclosure includes a method of forming an object using additive manufacturing. The method includes receiving a digital model of the object; predicting a shrinking characteristic or receiving a predicted shrinking characteristic of the object that will occur during thermal processing of the object, once formed; and generating, based on the shrinking characteristic of the object, instructions for forming a raft on which the object will be formed. In some embodiments, the instructions for forming the raft are configured to form a raft having a shrinking characteristic that reflects the shrinking characteristic of the object.

According to another aspect, there is provided a method of forming an object using additive manufacturing. The method includes receiving a digital model of the object; predicting a shrinking characteristic or receiving a predicted shrinking characteristic of the object that will occur during thermal processing of the object, once formed; and generating, based on the shrinking characteristic of the object, instructions for forming a raft on which the object will be formed so that a shrinking characteristic of the raft reflects the shrinking characteristic of the object. In some embodiments, the instructions for forming the raft include instructions for forming a base layer and one or more top layers, where the base layer and one or more top layers collectively form one or more drainage paths extending through the raft.

According to another aspect, there is provided a method of forming an object using additive manufacturing. The method includes receiving a digital model of the object; predicting a shrinking characteristic or receiving a predicted shrinking characteristic of the object that will occur during thermal processing of the object, once formed; and generating, based on the shrinking characteristic of the object, a toolpath for forming a multi-layer raft on which the object will be formed so that a shrinking characteristic of the raft reflects the shrinking characteristic of the object. In some embodiments, the toolpath is configured to form a base layer and one or more top layers.

Both the foregoing general description and the following detailed description are exemplary and explanatory only and are not restrictive of the features, as claimed. As used herein, the terms "comprises," "comprising," "including," "having," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." It should be noted that all numeric values disclosed or claimed herein (including all disclosed values, limits, and ranges) may have a variation of +/−10% (unless a different variation is specified) from the disclosed numeric value. In this disclosure, unless stated otherwise, relative terms, such as, for example, "about," "substantially," and "approximately" are used to indicate a possible variation of ±10% in the stated value. Moreover, in the claims, values, limits, and/or ranges of various claimed elements and/or features means the stated value, limit, and/or range +/−10%. The terms "object," "part," and "component," as used herein, are intended to encompass any object fabricated using the additive manufacturing techniques described herein.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments. There are many aspects and embodiments described herein. Those of ordinary skill in the art will readily recognize that the features of a particular aspect or embodiment may be used in conjunction with the features of any or all of the other aspects or embodiments described in this disclosure.

FIG. 7A shows a magnified top view of a portion of a raft according to some embodiments.

FIG. 8A shows a cross sectional view of a printed object according to some embodiments.

FIG. 9 depicts a flowchart of a method of forming an object using additive manufacturing according to some embodiments.

DETAILED DESCRIPTION

Embodiments of the present disclosure include systems and methods for forming contracting build supports. Reference now will be made in detail to examples of the present disclosure described above and illustrated in the accompanying drawings. Wherever possible, the same reference numbers will be used throughout the drawings to refer to the same or like parts.

Figure 1A:
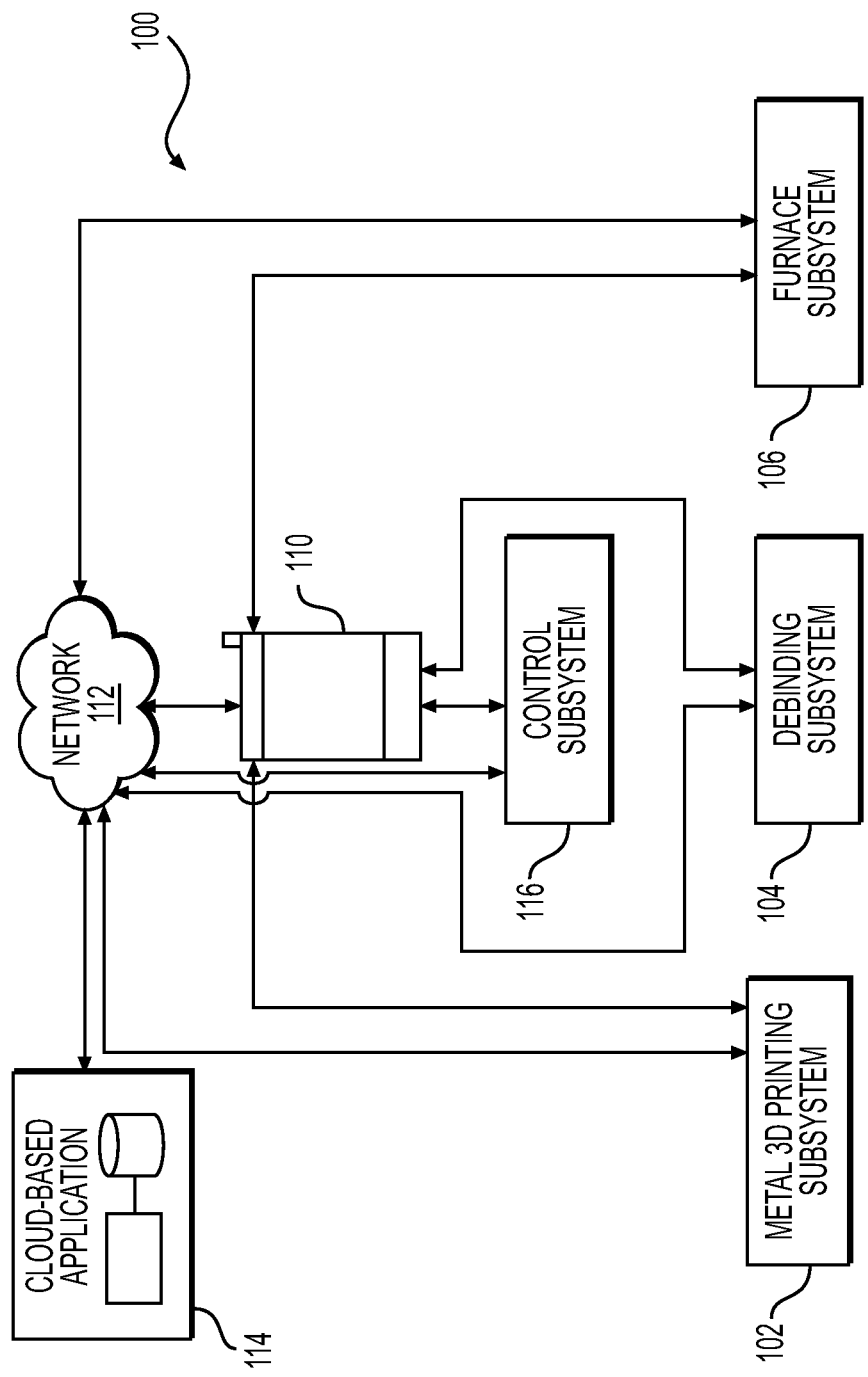
FIG. 1A is a block diagram of an additive manufacturing system according to some embodiments of the disclosure.

FIG. 1A illustrates an exemplary system 100 for forming a printed object, according to an embodiment of the present disclosure. System 100 may include a three-dimensional (3D) printer, for example, a metal 3D printing subsystem 102, and one or more treatment site(s), for example, a debinding subsystem 104 and a furnace subsystem 106, for treating the green part after printing. Metal 3D printing subsystem 102 may be used to form an object from a build material, for example, by depositing successive layers of the build material onto a build plate. The build material may include metal powder and at least one binder material. In some embodiments, the build material may include a primary binder material (e.g., a wax) and a secondary binder material (e.g., a polymer).

Debinding subsystem 104 may be configured to treat the printed object by performing a first debinding process, in which the primary binder material may be removed. In some embodiments, the first debinding process may be a chemical debinding process, as will be described in further detail with reference to FIG. 1C. In such embodiments, the primary binder material may dissolve in a debinding fluid while the secondary binder material remains, holding the metal particles in place in their printed form.

In other embodiments, the first debinding process may comprise a thermal debinding process. In such embodiments, the primary binder material may have a vaporization temperature lower than that of the secondary binder material. The debinding subsystem 104 may be configured to heat the deposited build material to a temperature at or above the vaporization temperature of the primary binder material and below the vaporization temperature of the secondary binder material such that the primary binder material is removed from the printed part. In alternative embodiments, the furnace subsystem 106 rather than a separate heating debinding subsystem 104 may be configured to perform the first debinding process. For example, the furnace subsystem 106 may be configured to heat the deposited build material to a temperature at or above the vaporization temperature of the primary binder material and below the vaporization temperature of the secondary binder material such that the primary binder material is removed from the deposited build material.

Furnace subsystem 106 may be configured to treat the printed object by performing a secondary thermal debinding process (or also a primary debinding process, as in the alternative embodiment described above), in which the secondary binder material and/or any remaining primary binder material may be vaporized and removed from the printed part. In some embodiments, the secondary debinding process may comprise a thermal debinding process, in which the furnace subsystem 106 may be configured to heat the part to a temperature at or above the vaporization temperature of the secondary binder material to remove the secondary binder material. The furnace subsystem 106 may then heat the part to a temperature just below the melting point of the metal powder to sinter the metal powder and to densify the metal powder into a solid metal part.

As shown in FIG. 1A, system 100 may also include a user interface 110, which may be operatively coupled to one or more components, for example, to metal 3D printing subsystem 102, debinding subsystem 104, and furnace subsystem 106, etc. In some embodiments, user interface 110 may be a remote device (e.g., a computer, a tablet, a smartphone, a laptop, etc.) or an interface incorporated into system 100, e.g., on one or more of the components. User interface 110 may be wired or wirelessly connected to one or more of metal 3D printing subsystem 102, debinding subsystem 104, and/or furnace subsystem 106. System 100 may also include a control subsystem 116, which may be included in user interface 110, or may be a separate element.

Metal 3D printing subsystem 102, debinding subsystem 104, furnace subsystem 106, user interface 110, and/or control subsystem 116 may each be connected to the other components of system 100 directly or via a network 112. Network 112 may include the Internet and may provide communication through one or more computers, servers, and/or handheld mobile devices, including the various components of system 100. For example, network 112 may provide a data transfer connection between the various components, permitting transfer of data including, e.g., part geometries, printing material, one or more support and/or support interface details, printing instructions, binder materials, heating and/or sintering times and temperatures, etc., for one or more parts or one or more parts to be printed.

Moreover, network 112 may be connected to a cloud-based application 114, which may also provide a data transfer connection between the various components and cloud-based application 114 in order to provide a data transfer connection, as discussed above. Cloud-based application 114 may be accessed by a user in a web browser, and may include various instructions, applications, algorithms, methods of operation, preferences, historical data, etc., for forming the part or object to be printed based on the various user-input details. Alternatively or additionally, the various instructions, applications, algorithms, methods of operation, preferences, historical data, etc., may be stored locally on a local server (not shown) or in a storage and/or processing device within or operably coupled to one or more of metal 3D printing subsystem 102, debinding subsystem 104, sintering furnace subsystem 106, user interface 110, and/or control subsystem 116. In this aspect, metal 3D printing subsystem 102, debinding subsystem 104, furnace subsystem 106, user interface 110, and/or control subsystem 116 may be disconnected from the Internet and/or other networks, which may increase security protections for the components of system 100. In either aspect, an additional controller (not shown) may be associated with one or more of metal 3D printing subsystem 102, debinding subsystem 104, and furnace subsystem 106, etc., and may be configured to receive instructions to form the printed object and to instruct one or more components of system 100 to form the printed object.

Figure 1B:
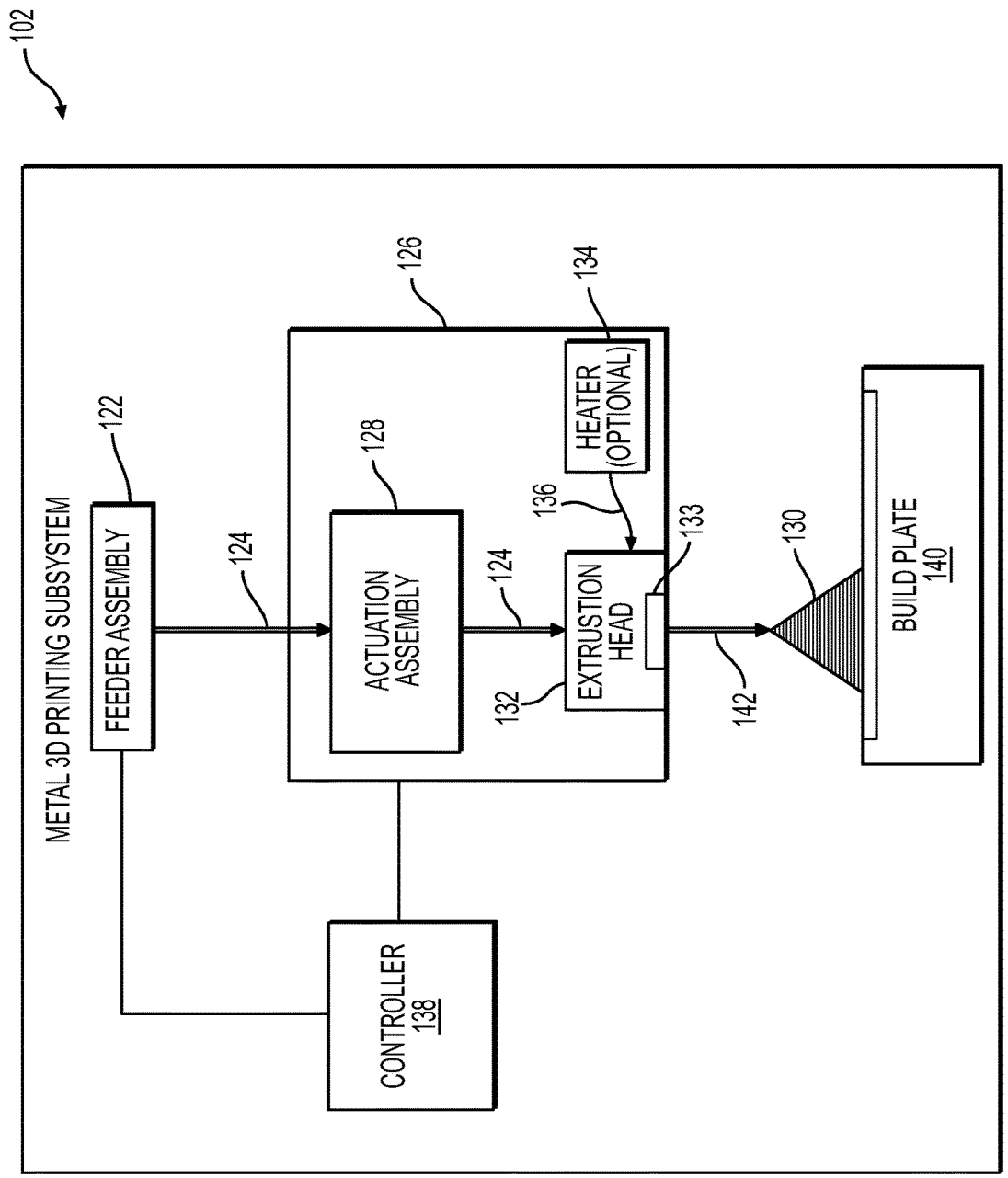
FIG. 1B illustrates an exemplary printing subsystem of the system of FIG. 1A.

FIG. 1B is a block diagram of a metal 3D printing subsystem 102 according to one embodiment. The metal 3D printing subsystem 102 may extrude build material 124 to form a three-dimensional part. As described above, the build material may include a mixture of metal powder and binder material. For example, the build material may include any combination of metal powder, plastics, wax, ceramics, polymers, among others. In some embodiments, the build material 124 may come in the form of a rod comprising a predetermined composition of metal powder and one or more binder components (e.g., a primary and a secondary binder).

Metal 3D printing subsystem 102 may include an extrusion assembly 126 comprising an extrusion head 132. Metal 3D printing subsystem 102 may include an actuation assembly 128 configured to propel the build material 124 into the extrusion head 132. For example, the actuation assembly 128 may be configured to propel the build material 124 in a rod form into the extrusion head 132. In some embodiments, the build material 124 may be continuously provided from the feeder assembly 122 to the actuation assembly 128, which in turn propels the build material 124 into the extrusion head 132. In some embodiments, the actuation assembly 128 may employ a linear actuation to continuously grip and/or push the build material 124 from the feeder assembly 122 towards the extrusion head 132.

In some embodiments, the metal 3D printing subsystem 102 includes a heater 134 configured to generate heat 136 such that the build material 124 propelled into the extrusion head 132 may be heated to a workable state. In some embodiments, the heated build material 124 may be extruded through a nozzle 133 to extrude workable build material 142 onto a build plate 140. It is understood that the heater 134 is an exemplary device for generating heat 136, and that heat 136 may be generated in any suitable way, e.g., via friction of the build material 124 interacting with the extrusion assembly 126, in alternative embodiments. While there is one nozzle 133 shown in FIG. 1B, it is understood that the extrusion assembly 126 may comprise more than one nozzle in other embodiments. In some embodiments, the metal 3D printing subsystem 102 may include another extrusion assembly (not shown in FIG. 1B) configured to extrude a non-sintering ceramic material onto the build plate 140.

In some embodiments, the metal 3D printing subsystem 102 comprises a controller 138. The controller 138 may be configured to position the nozzle 133 along an extrusion path relative to the build plate 140 such that the workable build material is deposited on the build plate 140 to fabricate a three dimensional printed object 130. The controller 138 may be configured to manage operation of the metal 3D printing subsystem 102 to fabricate the printed object 130 according to a three-dimensional model. In some embodiments, the controller 138 may be remote or local to the metallic printing subsystem 102. The controller 138 may be a centralized or distributed system. In some embodiments, the controller 138 may be configured to control a feeder assembly 122 to dispense the build material 124. In some embodiments, the controller 138 may be configured to control the extrusion assembly 126, e.g., the actuation assembly 128, the heater 134, the extrusion head 132, and/or the nozzle 133. In some embodiments, the controller 138 may be included in the control subsystem 116.

Figure 1C:
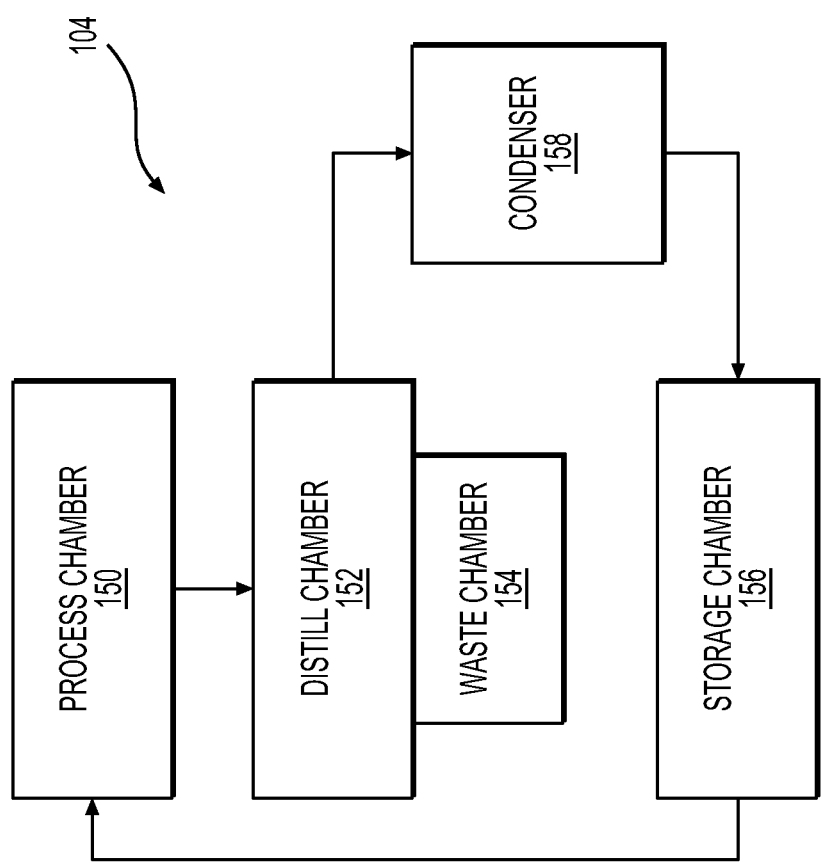
FIG. 1C illustrates an exemplary debinding subsystem of the system of FIG. 1A.

FIG. 1C depicts a block diagram of a debinder subsystem 104 for debinding a printed object 130 according to one embodiment. The debinder subsystem 104 may include a process chamber 150, into which the printed object 130 may be inserted for a first debinding process. In some embodiments, the first debinding process may be a chemical debinding process. In such embodiments, the debinder subsystem 104 may include a storage chamber 156 to store a volume of debinding fluid, e.g., a solvent, for use in the first debinding process. The storage chamber 156 may comprise a port which may be used to fill, refill, and/or drain the storage chamber 156 with the debinding fluid. In some embodiments, the storage chamber 156 may be removably attached to the debinder subsystem 104. In such embodiments, the storage chamber 156 may be removed and replaced with a replacement storage chamber (not shown in FIG. 1C) to replenish the debinding fluid in the debinding subsystem 104. In some embodiments, the storage chamber 156 may be removed, refilled with debinding fluid, and reattached to the debinding subsystem 104.

The debinding fluid contained in the storage chamber 156 may be directed to the process chamber 150 containing the inserted printed object 130. In some embodiments, the build material that the printed object 130 is formed of may include a primary binder material and a secondary binder material. In some embodiments, the printed object 130 in the process chamber 150 may be submerged in the debinding fluid for a predetermined period of time. In such embodiments, the primary binder material may dissolve in the debinding fluid while the secondary binder material stays intact.

In some embodiments, the debinding fluid containing the dissolved primary binder material (hereinafter referred to as "used debinding fluid") may be directed to a distill chamber 152. For example, after the first debinding process, the process chamber 150 may be drained of the used debinding fluid, and the used debinding fluid may be directed to the distill chamber 152. In some embodiments, the distill chamber 152 may be configured to distill the used debinding fluid. In some embodiments, the debinding subsystem 104 may further include a waste chamber 154 fluidly coupled to the distill chamber 152. In such embodiments, the waste chamber may collect waste accumulated in the distill chamber 152 as a result of the distillation. In some embodiments, the waste chamber 154 may be removably attached to the debinding subsystem 104 such that the waste chamber 154 may be removed and replaced after a number of distillation cycles. In some embodiments, the debinding subsystem 104 may include a condenser 158 configured to condense vaporized used debinding fluid from the distill chamber 152 and return the debinding fluid back to the storage chamber 156.

Figure 1D:
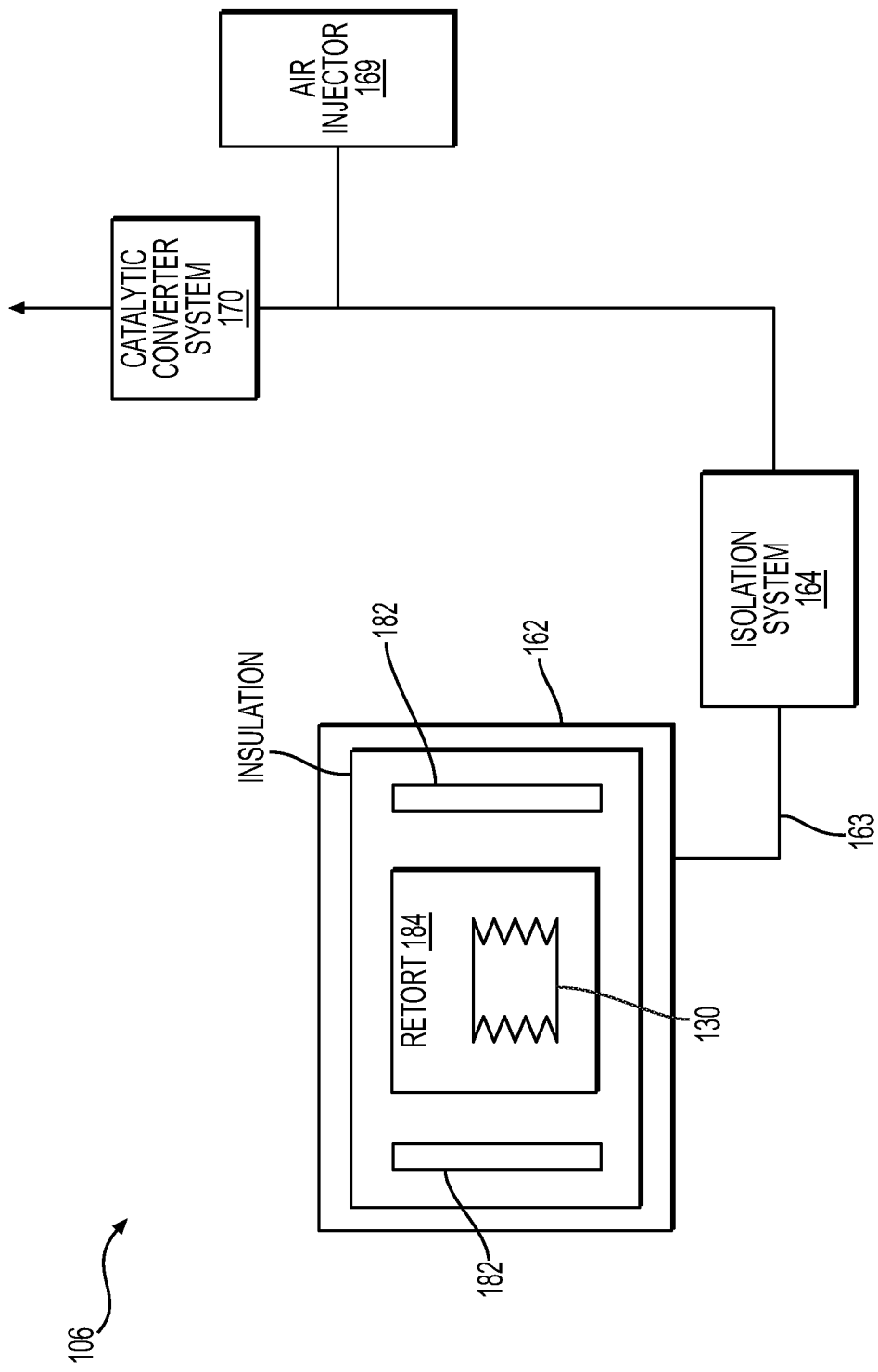
FIG. 1D illustrates an exemplary furnace subsystem of the system of FIG. 1A.

FIG. 1D is a block diagram of the furnace subsystem 106 according to exemplary embodiments. The furnace subsystem 106 may include a furnace chamber 162, an isolation system 164, an air injector 169 (also referred to as an oxygen injector, which may introduce air or oxygen gas into the system), and a catalyst converter system 170.

The furnace chamber 162 may be a sealable and insulated chamber designed to enclose a controlled atmosphere substantially free of oxygen to prevent combustion. In the context of the current disclosure, a controlled atmosphere refers to an atmosphere being controlled for one or more of temperature, composition, and pressure. The furnace chamber 162 may include one or more heating elements 182 for heating the atmosphere enclosed within the furnace chamber 162. As shown in FIG. 1D, the printed object 130 may be placed in the furnace chamber 162 for thermal processing. e.g., a thermal debinding process or a densifying process. In some embodiments, the furnace chamber 162 may be heated to a suitable temperature as part of the thermal debinding process in order to degrade any binder components included in the printed object 130 and then may be heated to just below a sintering temperature to densify the part. In some embodiments, the furnace chamber 162 may include heat-conductive walls (e.g., graphite walls) to spread heat generated by the heating elements 182 within the furnace chamber 162, thereby enhancing temperature uniformity in a region where the printed object 130 is located. In some embodiments, the furnace chamber 162 may include a retort 184 comprising a graphite box with walls partially or fully enclosing the region where the printed object 130 is located. In some embodiments, the furnace chamber 162 may include one or more shelves on which the printed object 130 may be placed within the furnace chamber 162, as will be described in further detail with reference to FIG. 2. In some embodiments, the retort 184 may include the one or more shelves.

Gaseous effluent may be released into the atmosphere of the furnace chamber 162 as the printed object 130 is heated during a thermal processing, e.g., during the thermal debinding process. In some embodiments, the gaseous effluent may be pumped out of the furnace chamber 162, flowed through the isolation system 164, and directed towards the catalyst converter system 170. The isolation system 164 may be configured to prevent any downstream fluid (e.g., gas, particularly oxygen gas from air injector 169) from flowing back towards the furnace chamber 162. The isolation system 164 and/or catalytic converter system 170 may be configured to remove toxic fumes, e.g., at least a portion of the volatilized binder components, from the gaseous effluent.

Figure 2:
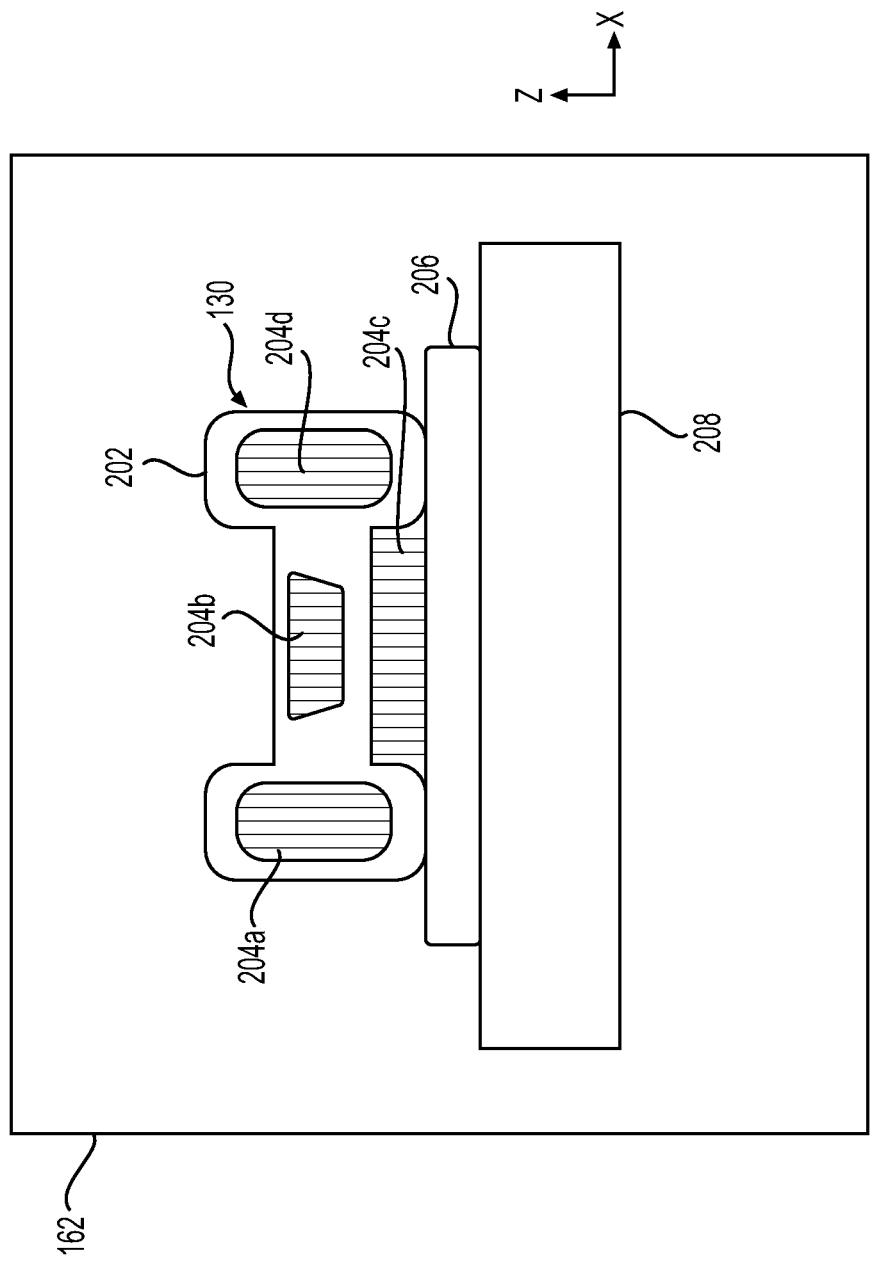
FIG. 2 shows a printed object in a furnace chamber according to some embodiments.

FIG. 2 illustrates the printed object 130 as it may appear on a shelf 208 of furnace chamber 162. In some embodiments, the printed object 130 may be a green part formed by additive manufacturing. The printed object 130 may comprise a metal part 202 (i.e., the desired metal object) and one or more support structures 204a-d according to some embodiments. In some embodiments, the one or more support structures 204a-d may provide support for the printing of the metal part 202. For example, support structures 204c may be configured to uphold a portion of the metal part 202 during an additive manufacturing process. While four support structures 204a-d are shown in FIG. 2, it is understood that the number and shape of the support structures may vary depending on the metal part 202 being formed. In some embodiments, the printed object 130 may include a release layer (not shown) between the metal part 202 and the one or more support structures 204a-d. For example, the release layer may be a non-sintering ceramic layer between the metal part 202 and the one or more support structures 204a-d. The non-sintering ceramic layer (hereinafter referred to as a ceramic separation layer) may be configured to facilitate the detachment of the metal part 202 from the one or more support structures 204a-d after a densifying process.

The printed object 130 may be inserted in the furnace chamber 162 of the furnace subsystem 106 for thermal processing. As shown in FIG. 2, the furnace chamber 162 may include a shelf 208 onto which the printed object 130 may be placed. While one shelf 208 is shown in FIG. 2 for ease, the furnace chamber 162 may include a plurality of shelves. In some embodiments, the shelf 208 may be composed of graphite. In such embodiments, the shelf 208 may react unfavorably with the printed object 130 if the printed object 130 is placed directly onto a surface of the shelf 208. Accordingly, a setter 206 may be placed on a surface of the shelf 208. In such embodiments, the printed object 130 may be placed on top of the setter 206, as shown in FIG. 2. While one setter 206 is shown in FIG. 2, the furnace chamber 162 may include one or more setters on one or more shelves 208, with a printed object 130 on each setter 206. The setter 206 may be composed of a material that is inert relative to the material of which printed object 130 is formed. In some embodiments, the setter 206 may be composed of alumina, which may be inert to a material, e.g., steel, used in the printed object 130. In some embodiments, the setter 206 may be composed of a different material when the printed object 130 comprises titanium. The specific use of shelves and setters may depend upon the architecture and materials used in the furnace chamber 162.

During a thermal processing of the printed object 130, i.e., the metal part 202 and the one or more support structures 204a-d, may shrink, but the setter 206 may not shrink during the thermal processing. Accordingly, the printed object 130 may move relative to the setter 206. This motion may be caused by shrinkage of the printed object 130 on a surface of the non-shrinking setter 206, which may cause frictional resistance between the printed object 130 and the setter 206. In instances where the shrinkage stress cannot overcome the frictional resistance, the printed object 130 may crack and fail to shrink appropriately.

Figure 3A:
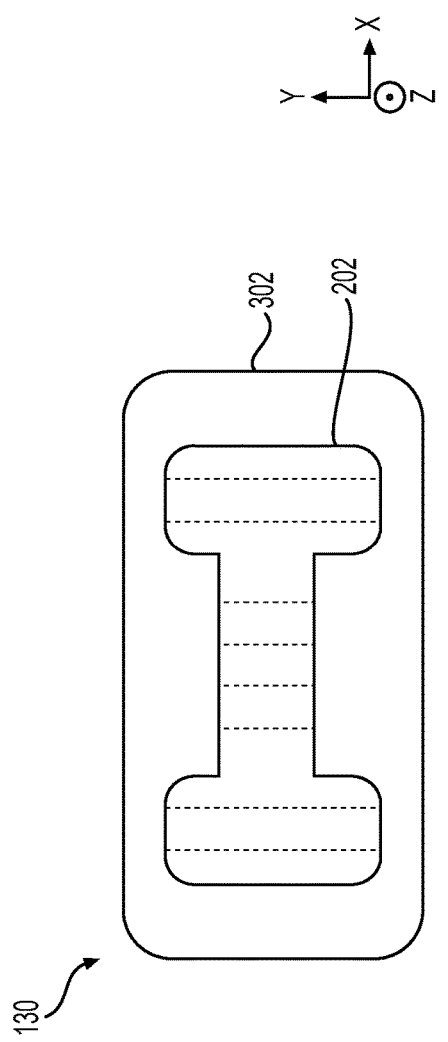
FIG. 3A shows a top view of a printed object according to some embodiments.
Figure 3B:
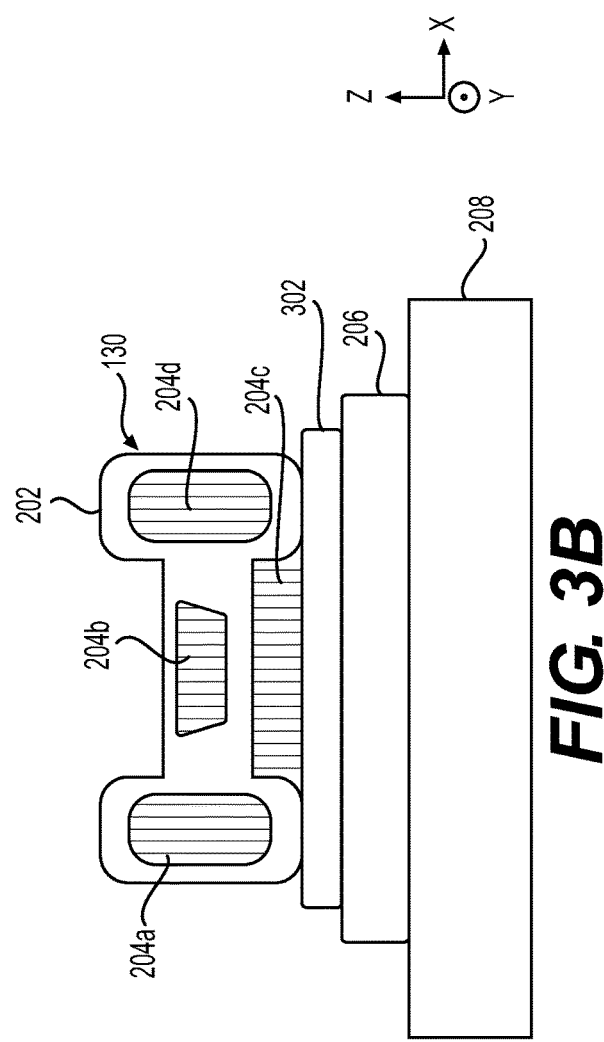
FIG. 3B shows a cross sectional view of a printed object in a furnace chamber according to some embodiments.

As shown in FIGS. 3A-3B, to permit shrinkage, the printed object 130 may further include a raft 302. Raft 302 may form a base of the printed object 130 and be positioned above the setter 206. In some embodiments, the raft 302 may be composed of the same materials as the metal part 202 so that the raft 302 and the metal part 202 share similar shrinking characteristics. The raft 302 may be separate from support structures 204a-d or may protrude upwards toward metal part 202 to incorporate one or more support structures 204a-d. For example, the raft 302 may be designed to protrude upwards to incorporate the support structure 204c (shown in FIG. 3B) rather than having a separate support structure, or to allow for a smaller support structure, formed between the metal part 202 and the raft 302. In some embodiments, an interface layer, e.g., a ceramic interface layer, may be formed between the metal part 202 and the raft 302, for example, to facilitate separation of the raft 302 from the metal part 202. In some embodiments, an interface layer, e.g., a ceramic interface layer, may be formed between the one or more support structures 204a-d and the raft 302, for example, to facilitate separation of the raft from the one or more support structures 204a-d.

Figure 3C:
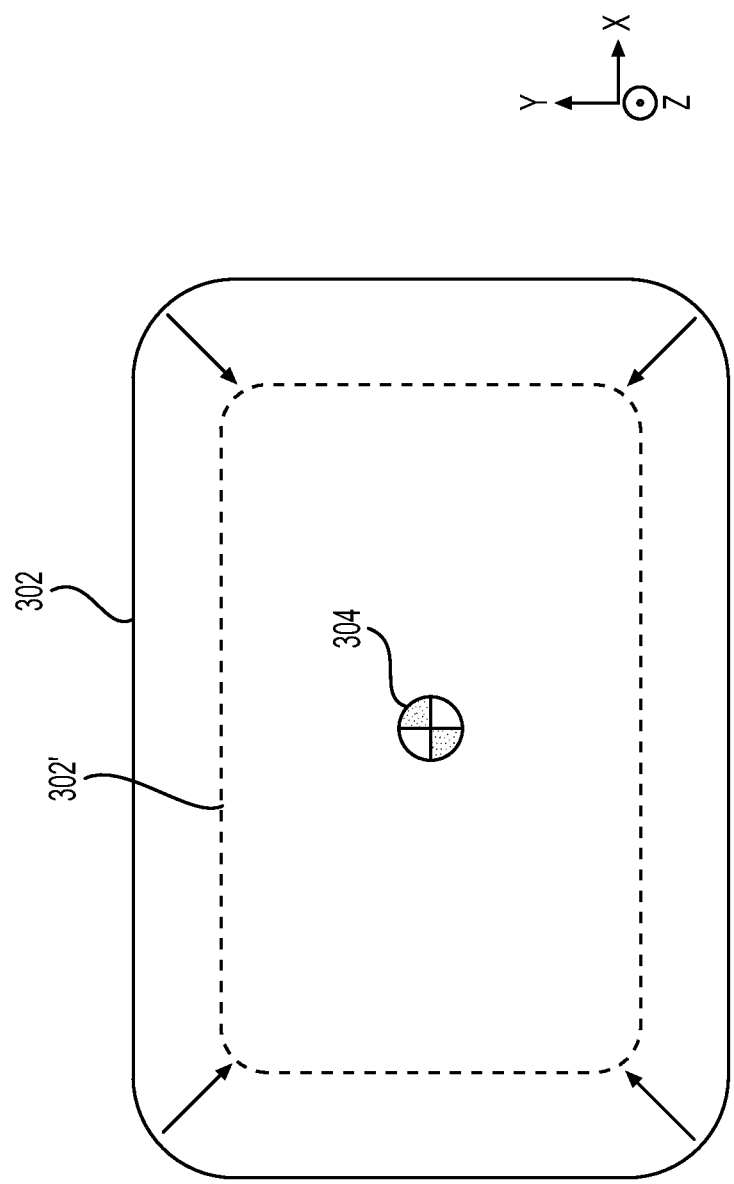
FIG. 3C shows a top view of a raft according to some embodiments.

As described above, the raft 302 may shrink during a thermal processing of the printed object 130. As shown in FIG. 3C, the raft 302 may shrink generally uniformly towards a center of gravity 304 or a center of mass to form a densified raft 302', i.e., a shrunken raft 302', in which the material from which raft 302 is formed has been sintered. In the context of the current disclosure, it is understood that rafts may shrink towards their "center of gravity" or their "center of mass," and where "center of gravity" is used herein, "center of mass" may also be appropriate, and vice versa. Further, in some aspects, the design of raft 302 may be configured to shrink the raft towards a location that is offset from the center of mass or the center of gravity—i.e., the point towards which raft 302 is configured to shrink may be biased relative to the center of mass or the center of gravity. The shrinkage may cause friction between a bottom surface of the raft 302 and a surface on which the printed object 130 is placed (e.g., the setter 206 or the shelf 208). In the context of the current disclosure, a length of a component may be referred to as the length along the x-axis, a width of a component may be referred to as the width along the y-axis, and a height of a component may be referred to as the height along the z-axis, where the x-axis is perpendicular to the y-axis, and the z-axis is perpendicular to a plane formed by the x-axis and y-axis (xy plane). In some embodiments, a thickness of the raft 302, i.e., a height of the raft 302 along the z-axis, may be selected such that a resistance to friction may be dissipated across the height of the raft 302, thereby reducing the friction with the surface on which the printed object 130 is placed or rendering the friction obsolete.

In some embodiments, the raft 302 may comprise certain attributes in order to facilitate shrinkage while taking into account the effects of the resistance to friction generated between a bottom surface of the raft 302 and a surface on which the printed object 130 is placed. Some exemplary embodiments of such raft 302 attributes are described in further detail as follows.

In some embodiments, a density of the material comprising the raft 302 may be increased. In some embodiments, the raft 302 may include different regions within a plane of one layer or may include different regions from one layer to another. An amount of material deposited within a layer may be compared to the total possible amount of material that may be deposited in the layer. The ratio of these two values, i.e., the amount of material deposited on a layer and a total possible amount of material that may be deposited on the layer, may be referred to as the relative density. The relative density may range from 0 to 100%, where numbers closer to 0 may correspond to less material deposited as opposed to numbers closer to 100%, which may correspond to more deposited material. A relative density of 100% may indicate that the total possible amount of material has been deposited on the layer, which may indicate that the layer is full. In some instances, the material comprising the raft 302 may shrink and carry stress, e.g., stress resulting from friction. Accordingly, a raft 302 with a high relative density may be stronger than a raft 302 with a low relative density.

In some embodiments, strands of material from which the raft 302 is comprised may be printed in a pattern to facilitate shrinkage. Such patterns may include gaps or spacing, e.g., zigzags, radial patterns, concentric patterns, etc., that may also reduce the amount of material needed to form the raft 302 while providing a strong raft 302 that facilitates controlled shrinkage of the printed object 130. In some embodiments, the raft 302 may comprise printed strands aligned towards a center of mass of the printed object 130 that project into a plane of the raft 302. That is, a substantial number of material strands in a given layer of the raft 302 may be aligned in a direction such that the material strands in that layer are oriented in a direction towards the center of mass of the printed object 130 as projected onto the plane of the raft 130.

As alluded to above, the raft 302 may comprise more than one layers to isolate a base of the printed object 130 from a surface of the setter 206 or the shelf 208 that does not shrink. In such embodiments, the raft 302 may comprise one or more layers of non-sintering, e.g., ceramic, material separating the layers, or groups of layers, of the raft formed of the printed strands. Including portions or layers of non-sintering material between layers of the raft may relieve a frictional resistance between the raft 302 and a non-shrinking surface of, e.g., a setter 206 or shelf 208. In the context of the current disclosure, a large frictional resistance between the raft 302 and the surface of setter 206 or shelf 208 may indicate a frictional resistance that would otherwise inhibit shrinkage of the printed object 130. In some embodiments, the one or more layers of non-sintering ceramic material may be included under the raft 302 as one or more base layers to further relieve the friction. In some embodiments, the one or more layers of non-sintering ceramic material may be included throughout the raft 302 separated at predetermined distances. In some aspects, the raft 302 may be composed of one or more stacked rafts, and one or more layers of non-sintering ceramic may separate each raft.

In some embodiments, a thickness of the raft 302, i.e., a height of the raft 302 along the z-axis, may be determined based on a mass and/or size of the printed object 130. In some embodiments, the thickness and/or other dimensions of the raft 302 may vary depending on the size and mass of the printed object 130, e.g., the metal part 202 and the one or more supporting structures 204a-d, positioned on a surface of the raft 302. For example, for printed objects 130 having the same overall footprint, a taller printed object 130 may exert a larger pressure on the raft 302, thereby leading to a larger total frictional force at an interface between a bottom surface of the raft 302 (the raft base), and a top surface of the setter 206 or the shelf 208 upon which the bottom surface of the raft contacts. During thermal processing, the printed object 130 may create an internal tensile stress resulting in a shrinkage of the printed object 130. The total force generated by the internal tensile stress may depend on a thickness of the raft 302. For example, the total force generated by the internal tensile stress may be higher for a thicker raft 302. Accordingly, in instances where the metal part 202 is substantially larger than the raft 302, an increased thickness of the raft 302 may assist the metal part 202 during shrinkage created by thermal processing by overcoming the frictional forces opposing the shrinkage.

In certain aspects, raft 302 may have an outer perimeter that is based on the metal part 202. For example, an outer contour or perimeter of raft 302 may be dimensioned so as to be relatively larger than an outer contour or perimeter of a base of the metal part 202 that will be supported by the raft 302. In some examples, an outer contour or perimeter of raft 302 may be dimensioned so as to be relatively larger than an outer contour or perimeter of the metal part 202 as a whole. In other embodiments, an outer contour or perimeter of raft 302 may be dimensioned so as to be approximately equal to an outer contour or perimeter of the metal part 202.

In some embodiments, the raft 302 may have certain attributes unrelated to shrinkage and friction. For example, in some embodiments, a swelling rate for the raft 302 may be matched to the swelling rates of the metal part 202 and the one or more support structures 204a-d. During a first debinding process, e.g., a chemical debinding process, the printed object 130 may be immersed in a debinding fluid. Binder material, e.g., primary binder material, included in the printed object 130 may be dissolved in the debinding fluid. In some embodiments, the debinding fluid may deform the printed object 130 when the debinding fluid permeates the printed object 130 to dissolve the primary binder material. For example, the debinding fluid enters the surface of the printed object 130 and permeates inward to dissolve the primary binder. As the primary binder is evacuated from the printed object 130 and replaced by the debinding fluid, the printed object 130 may increase in volume, i.e., swell, at a specific rate. In some instances, the printed object 130 may swell in a non-uniform manner if the swelling rate for the raft 302 and the swelling rates of the metal part 202 and the one or more support structures 204a-d are not matched. Specifically, if the swelling rates of the raft 302, metal part 202, and the one or more support structures 204a-d differ, large internal stresses may be generated, which resist this differential swelling. Such internal stresses may cause cracks and deformation of the printed object 130. Accordingly, the raft 302 and/or toolpath of the print head used to form the raft when printing the raft may be tailored to reflect the swelling rate of the metal part 202 and the one or more support structures 204a-d reduce such internal stresses.

In some embodiments, a raft 302 swelling rate may be modified by increasing a diffusion length of the raft 302. The diffusion length may refer to a minimum distance from any interior portion of the raft 302 to an exterior surface of the raft 302. The diffusion length may be modified by adjusting one or more parameters of the raft 302, such as raft height or raft thickness (xy), as will be described in further detail with reference to FIGS. 5B-5C.

Figure 4A:
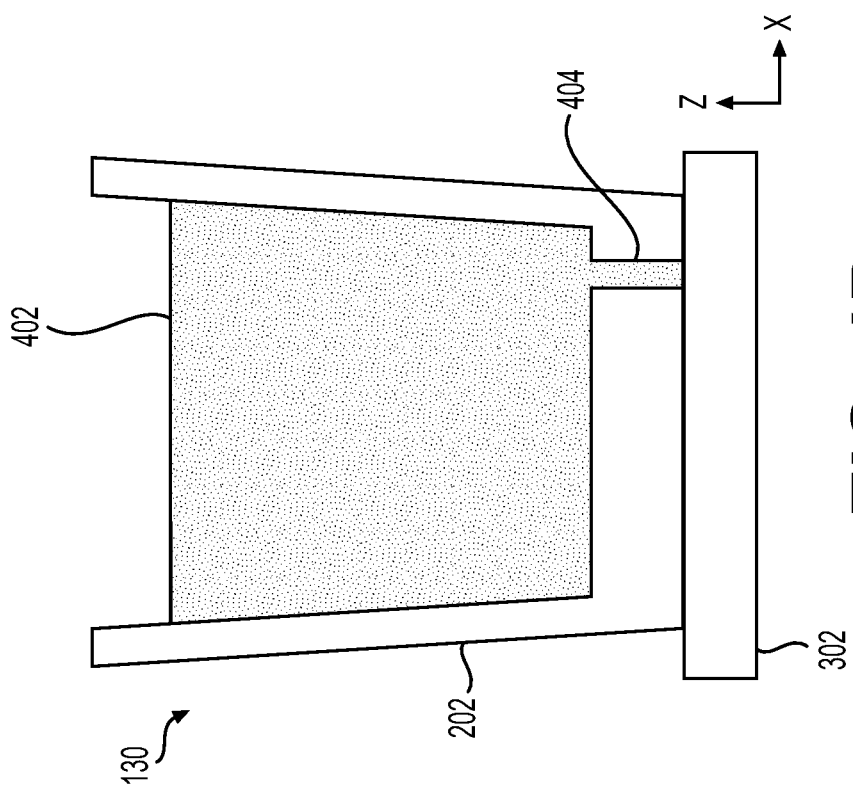
FIG. 4A shows a cross sectional view of a printed object during a chemical debinding process.
Figure 4B:
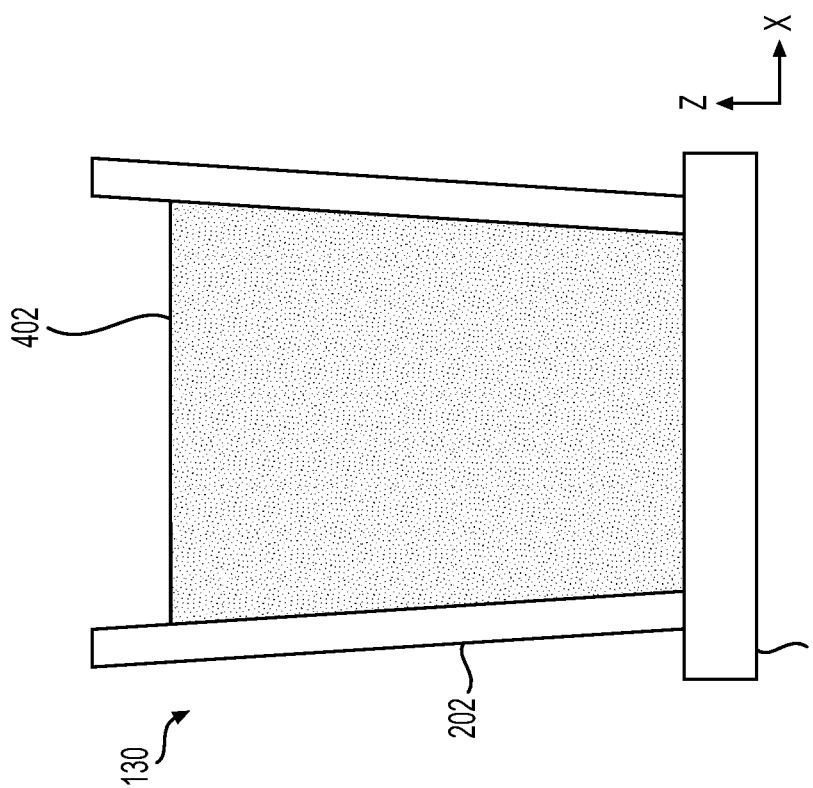
FIG. 4B shows a cross sectional view of a printed object during a chemical debinding process.
Figure 5A:
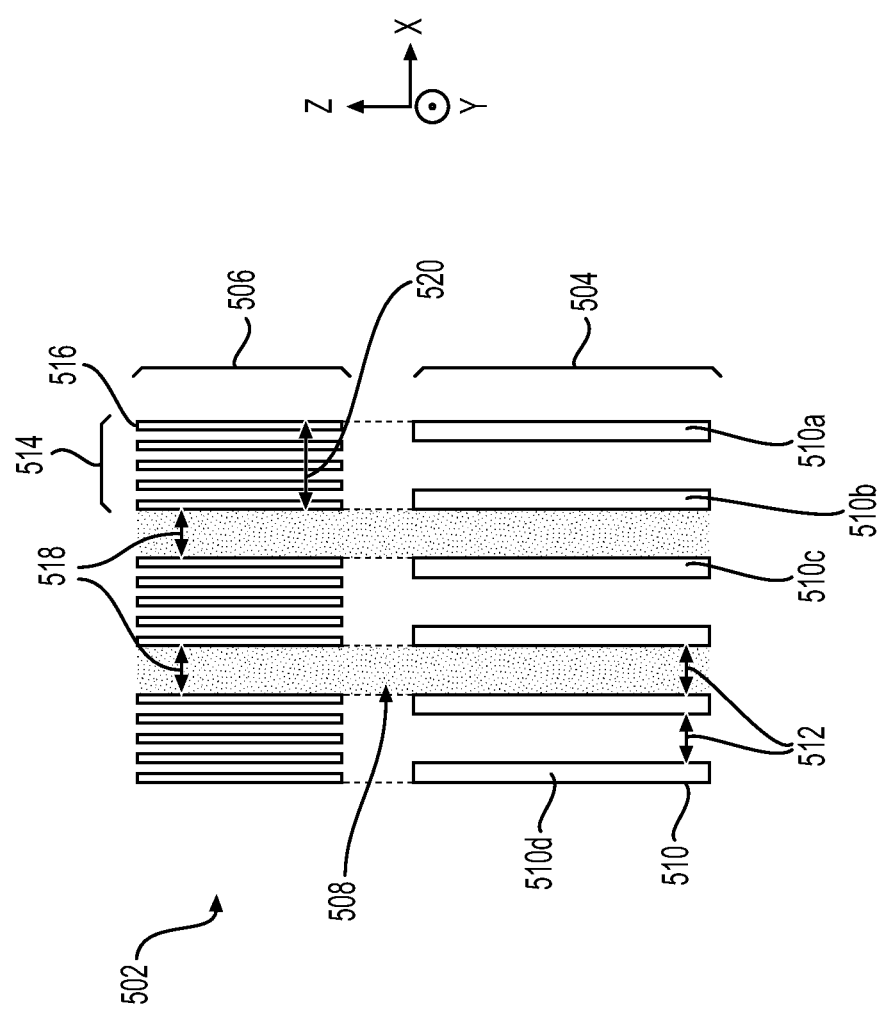
FIG. 5A shows a magnified cross sectional view of a raft according to some embodiments.
Figure 5B:
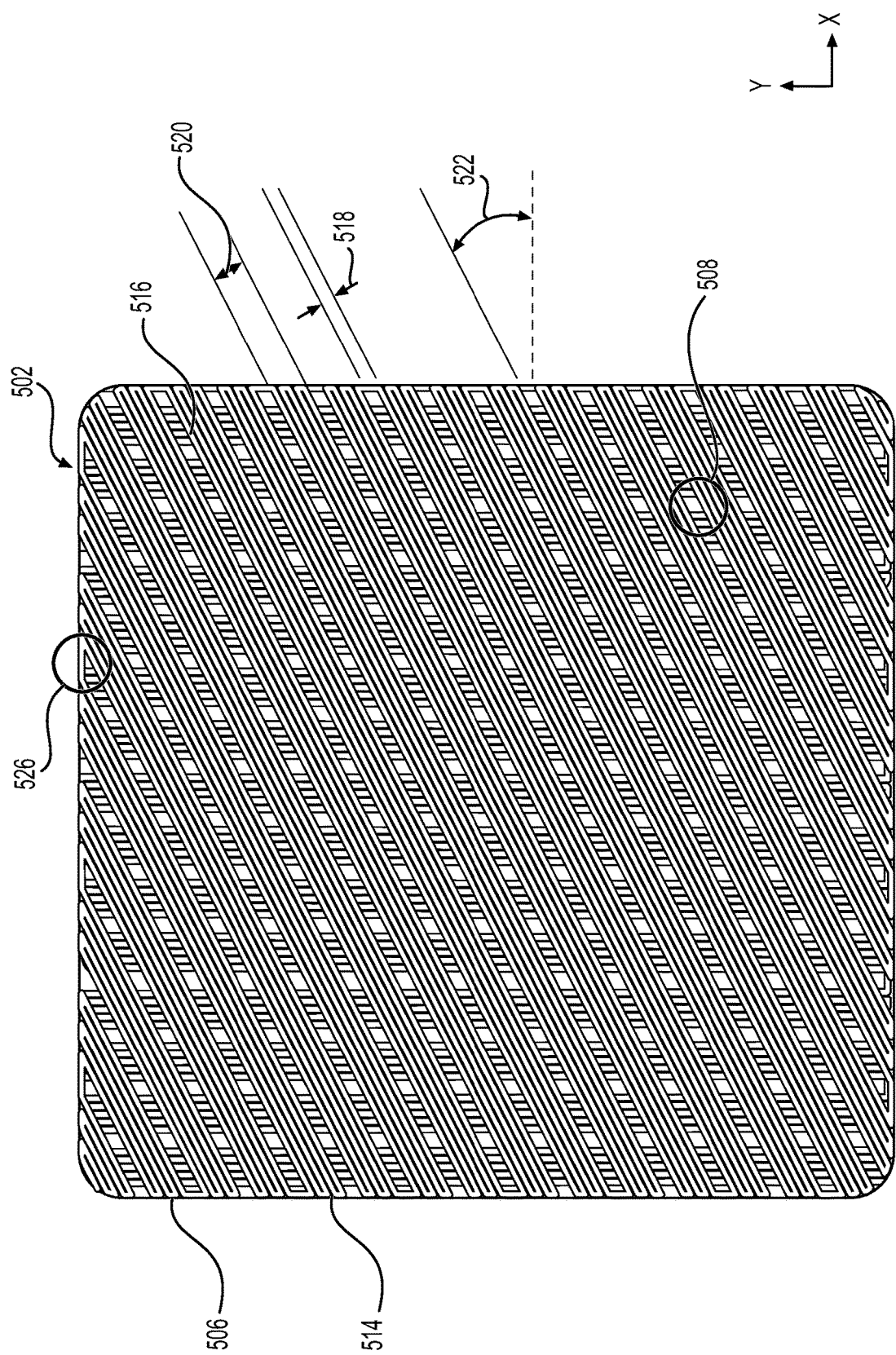
FIG. 5B shows a top view of a raft.
Figure 5C:
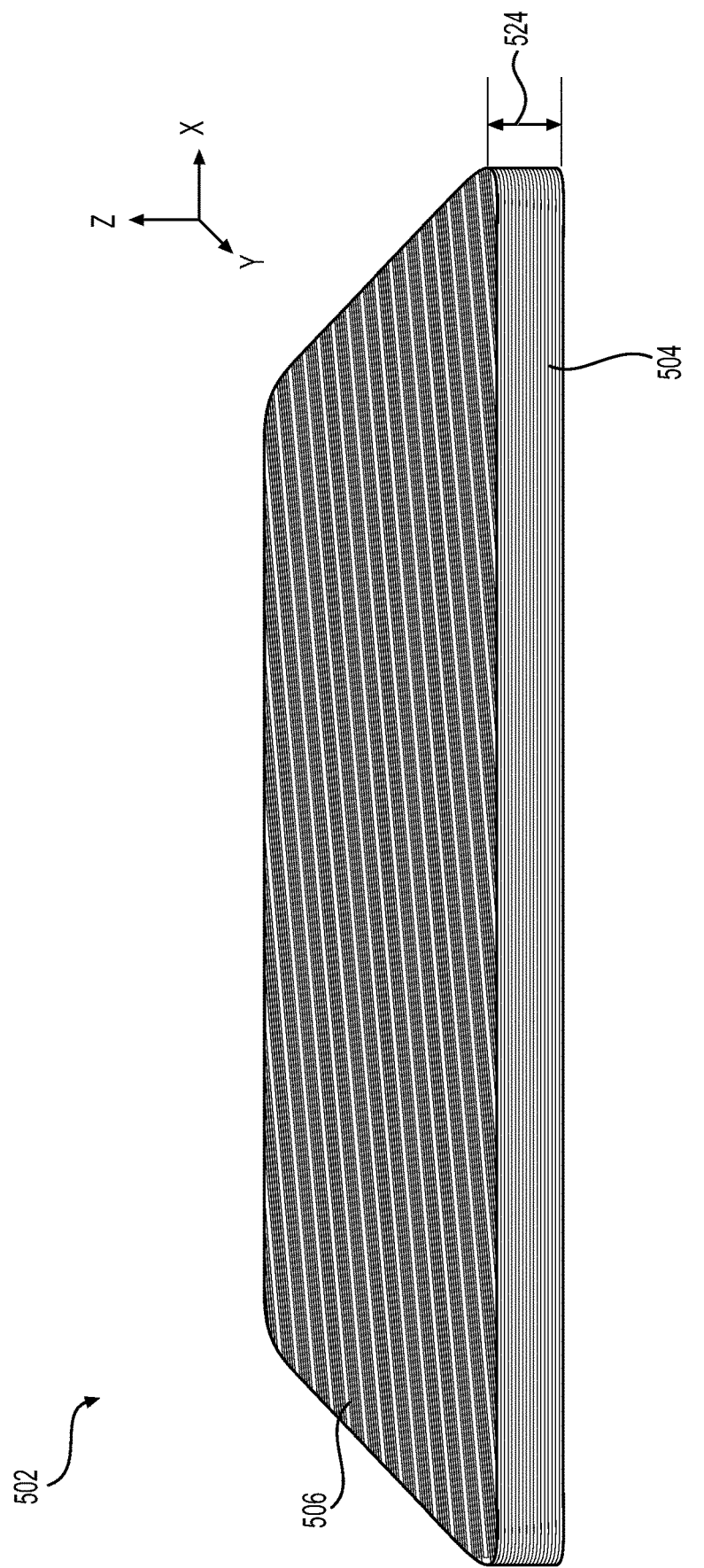
FIG. 5C shows a side view of the raft according to some embodiments.

In some embodiments, the raft 302 may comprise drainage features to prevent entrapment of the debinding fluid. As described above, the printed object 130 may be immersed in the debinding fluid during a first debinding process, e.g., a chemical debinding process. After the completion of the first debinding process, the debinding fluid surrounding the printed object 130 may be removed. In some instances, the printed object 130 may be shaped such that the debinding fluid may be trapped within the printed object 130, as shown in FIGS. 4A-4B. In such instances, the trapped debinding fluid may pool within the printed object 130 as the printed object 130 is subsequently dried for further processing, e.g., thermal processing. The trapped debinding fluid may evaporate and deposit the dissolved primary binding material within the printed object 130. In such embodiments, this excess primary binding material deposited within the printed object 130 may cause variations in subsequent thermal processing, e.g., thermal debinding and/or densifying process, of the printed object 130 due to gradients in carbon distribution. FIG. 4A depicts an exemplary embodiment of the printed object 130 containing trapped debinding fluid 402. As shown in FIG. 4A, the printed object 130 may comprise a metal part 202 in the form of a cylinder with no top or bottom faces. A solid raft 302 may prevent draining of the debinding fluid 402, thereby trapping the debinding fluid 402 within the printed object 130. FIG. 4B shows another exemplary embodiments of the printed object 130 containing trapped debinding fluid 402. As shown in FIG. 4B, the printed object may comprise a metal part 202 in the form of a cup including a drainage hole 404 through which the debinding fluid 402 may flow in or out. Similarly, a solid raft 302 may prevent draining of the debinding fluid 402 through the drainage hole 404, thereby trapping the debinding fluid 402 within the printed object 130. Accordingly, the raft 302 may be formed to include drainage features as described in further detail below with reference to FIGS. 5A-5C. FIGS. 5A-5C depict a raft 502 according to various embodiments. The raft 502 may be any combination of the above-described embodiments of the raft 302.

FIG. 5A shows a magnified cross sectional view of a portion of the raft 502 along the xz plane according to some embodiments. As shown in FIG. 5A, the raft 502 may comprise a base layer 504 and a top or middle layer 506. While one base layer 504 and one top layer 506 are shown in FIG. 5A for ease, it is understood that the raft 502 may comprise one or more base layers 504 and/or one or more top layers 506. The one or more base layers 504 and the one or more top layers 506 may be formed by the extrusion of build material 124 through the nozzle 133, as described above with reference to FIG. 1B. In some embodiments, build material 124 may be extruded in parallel lines to form the base layer 504 and the top layer 506. In the context of the current disclosure, each of the parallel lines may be a continuous line of beads extruded from the nozzle 133. That is, the build material 124 may be extruded as a continuous line of beads to form the base layer 504 and the top layer 506. Accordingly, each of the parallel lines may have a width (along the x-axis) and height (along the z-axis) corresponding to a width (along the x-axis) and height (along the z-axis) of each of the beads comprising the line. In some embodiments, extrusion forces may result from increased hydraulic resistance at the nozzle 133 if there is not enough space for a bead of a certain size to exit the nozzle 133.

The base layer 504 may comprise one or more parallel lines of extruded beads 510, as shown in FIG. 5A. In some embodiments, the height of the one or more parallel lines of extruded beads 510 may be adjusted based on variations in a predetermined bead width. Variations in the predetermined bead width may be caused by pressure depending on a flatness of a surface on which the raft 502 is placed and/or variations in the parallelism of the lines of beads relative to an x-axis and y-axis motion plane (xy motion plane) of the nozzle 133. In some embodiments, the height of the lines of extruded beads 510 may be up to about 350 µm. As shown in FIG. 5A, each of the lines of extruded beads 510 may be separated by a base layer spacing 512. In some instances, the base layer spacing 512 may also be referred to as a base layer drainage path.

As shown in FIG. 5A, the top layer 506 may comprise one or more raft segments 514. In some embodiments, each of the one or more raft extruded segments 514 may comprise one or more parallel lines of extruded beads 516. The one or more parallel lines of beads 516 included in a raft segment 514 may be positioned adjacent to one another, and each of the raft segments 514 may be separated by a top layer spacing 518. In some instances, the top layer spacing 518 may also be referred to as a top layer drainage path. The top layer spacing 518 may be approximately equal to the base layer spacing 512. In some embodiments, a width 520 of the raft segment 514 may equal a distance along the x-axis from one bottom line of extruded beads (e.g., 510*a*) to another adjacent parallel bottom line of extruded beads. As another example, the width 520 of the raft segment 514 may equal a distance along the x-axis from one bottom line of extruded beads 510*a* (e.g., 510*a*) to another parallel bottom line of extruded beads (e.g., 510*c* or 510*d*). This may allow the top layer spacing 518 to be aligned with an associated base layer spacing 512 such that a drainage path 508 may be formed, as will described in further detail below. It is understood that FIG. 5A depicts a portion of the raft 502 and that the raft 502 may include a drainage path 508 in other parts of the raft 502 in embodiments where the width of the raft segment 514 equals a distance along the x-axis from one bottom line of extruded beads (e.g., 510*a*) to a parallel bottom line of extruded beads (e.g., 510*d*) that is furthest away in the portion of the raft 502 depicted in FIG. 5A.

In some embodiments, the top layer 506 and the base layer 504 may be aligned such that the top layer spacing 518 and the associated base layer spacing 512 form a drainage path 508, as shown in FIG. 5A. The drainage path 508 may allow debinding fluid 402 to flow through the raft 502 from top to bottom and/or vice versa. Drainage path 508 may permit trapped debinder fluid 402 to drain out of the printed objects depicted in FIGS. 4A-4B. While the drainage paths 508 are shown as vertical flow paths in FIG. 5A, the drainage paths 508 may be tortious, diagonal, or take any shape that otherwise provides fluid connection from a top surface of the raft 502 to a bottom surface of the raft 502. For example, the top layer 506 may be positioned offset relative to what is shown in FIG. 5A such that a portion of raft segment 514 overlaps a portion of the base layer spacing 512, but does not completely cover the base layer spacing 512 so that a fluid connection is still provided between top layer spacing 518 and base layer spacing 512. As another example, the raft segment 514 may, in addition to or as an alternative to the offset, be rotated in the xy plane such that the raft segment 514 covers a portion of the base layer spacing 512, but does not completely cover the base layer spacing 512.

FIGS. 5B-5C show a top view and a side perspective view, respectively, of the raft 502 according to some embodiments. As shown in FIG. 5B, the raft 502 includes a top layer 506 formed of a plurality of raft segments 514. The raft segments 514 may be formed at a raft segment angle 522 and may have a predetermined raft segment width 520, as shown in FIG. 5B. Accordingly, each of the raft segments 514 in the top layer 506 may be formed at approximately the same raft segment angle 522 and may have approximately the same raft segment width 520. The raft segment angle 522 may vary from 0 to 360 degrees depending on the embodiment. The raft segments 514 may be separated from one another by a top layer spacing 518. As described above, the top layer 506 may be formed by the extrusion of build material 124 through the nozzle 133. In some embodiments, the build material 124 may be extruded as a continuous line of beads to form the top layer 506. In such embodiments, the continuous line of extruded beads may be printed at an angle parallel to the raft segment angle 522, with the exception of joining moves 526 at the end of each line to provide top layer spacing 518. In some embodiments, the joining moves 526 may be used to make the top layer 502 a continuous serpentine extrusion path of build material 124, thereby increasing the build rate although this is not necessary. The continuous serpentine extrusion path of build material 124 may be applied not only to the top layer 506, but to any layer included in the raft 502. In some embodiments, the raft segment width 520 may be a width of one line of beads 516, e.g., the width of one bead. In some embodiments, the raft segment width 520 may span the entirety of the top layer 502. In such embodiments, the top layer 502 may comprise one raft segment 514. In some embodiments, the raft segment width 520 may be increased such that a diffusion length of the raft 502 matches the diffusion length of the metal part 202 and the one or more support structures 204*a-d*, e.g., the raft segment width is generally equal to a width of the metal part 202 and/or one or more support structures so that raft 502 and metal part 202 may share similar shrinking and/or swelling characteristics. In some embodiments, the diffusion length of the raft 502 may be adjusted based on one or more of the height of the raft 502 along the z axis, or the width of raft segments 514 included in the raft 502.

In some embodiments, the raft 502 may comprise a second top layer immediately below the top layer 506 (most of the second top layer shown in FIG. 5B is covered by the top layer 506). The second top layer may similarly comprise a plurality of raft segments. In some embodiments, each of the plurality of raft segments included in the second top layer may comprise a raft segment width equal to that of the top layer 506, but a different raft segment angle. For example, the second top layer shown in FIG. 5B is formed of a plurality of raft segments formed at an angle perpendicular to the x-axis, i.e., along the y-axis although any angle offset from raft segment angle 522 may be used. In some embodiments, the second top layer may comprise a raft segment width different from that of the top layer 506. Each of the plurality of raft segments included in the second top layer may be separated by a second top layer spacing. In some embodiments, the second top layer spacing may be equal to the top layer spacing 518 while in others, it may be different. As shown in FIG. 5B, the top layer spacing 518 may overlap with the second top layer spacing to form drainage paths 508 at each overlapping portion. That is, debinding fluid may flow through the top layer 506 via the top layer spacing 518 and also through the second top layer via the second top layer spacing that aligns with top layer spacing 518 such that the debinding fluid may not be trapped within the printed object 130.

As shown in FIG. 5C, a thickness 504 of the raft 502, i.e., a height of the raft 524 along the z-axis, may be selected such that a resistance to friction may be dissipated across the height of the raft 502, thereby rendering the friction obsolete. In some embodiments, the thickness 504 of the raft 502 may be determined by the number of layers included in raft 502. For example, the thickness of the raft 502 may be increased by increasing the number of layers, e.g., top layers and/or base layers included in the raft 502.

In some embodiments, various raft segment angles may be uniformly distributed throughout the raft 502. For example, the raft 502 may include a plurality of layers, e.g., top layers, where each of the plurality of layers are oriented at a first raft segment angle or at a second raft segment angle. In the context of the current disclosure, uniformly distributing the raft segment angles throughout the raft 502 in this example may indicate that an uppermost top layer may be oriented at the first raft segment angle, the next top layer may be oriented at the second raft segment angle, a third top layer may be oriented at the first segment angle, a fourth top layer may be oriented at the second segment angle, etc. In some instances, the raft segment angle may be different for each two or more layers (e.g., the first and second top layers may be oriented at the first raft segment angle, the third and fourth top layers may be oriented at the second raft segment angle, etc.). It is understood that the raft 502 may include more than two raft segment angles and any number of layers, e.g., top layers and/or base layers, where each of the layers may be oriented at one of the two or more raft segment angles such that the raft segment angles may be uniformly distributed throughout the raft 502. Shrinkage stress may be distributed relatively more evenly towards a center of gravity of the metal part 202 and the one or more support structures 204a-d by uniformly distributing the raft segment angles throughout the raft 502.

In some embodiments, the raft segment angle change for each successive layer included in the raft 502. In such embodiments, one or more extruded beads included in the line of beads forming a layer (hereinafter referred to as an upper layer) may fall into a spacing between raft segments in a layer immediately below it (hereinafter referred to as a lower layer), as shown in FIG. 6A.

Figure 6A:
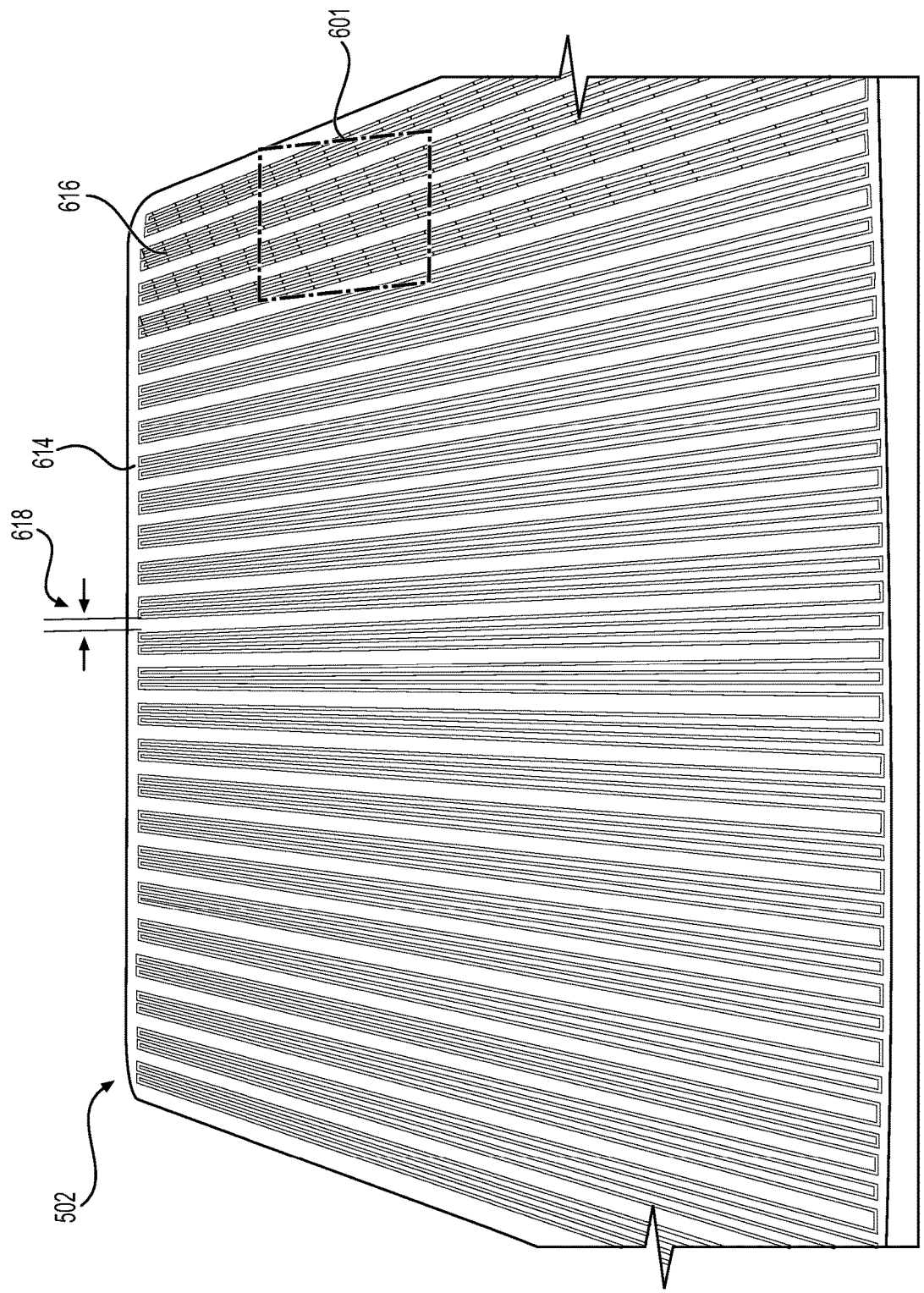
FIG. 6A shows a top view of a raft.
Figure 6B:
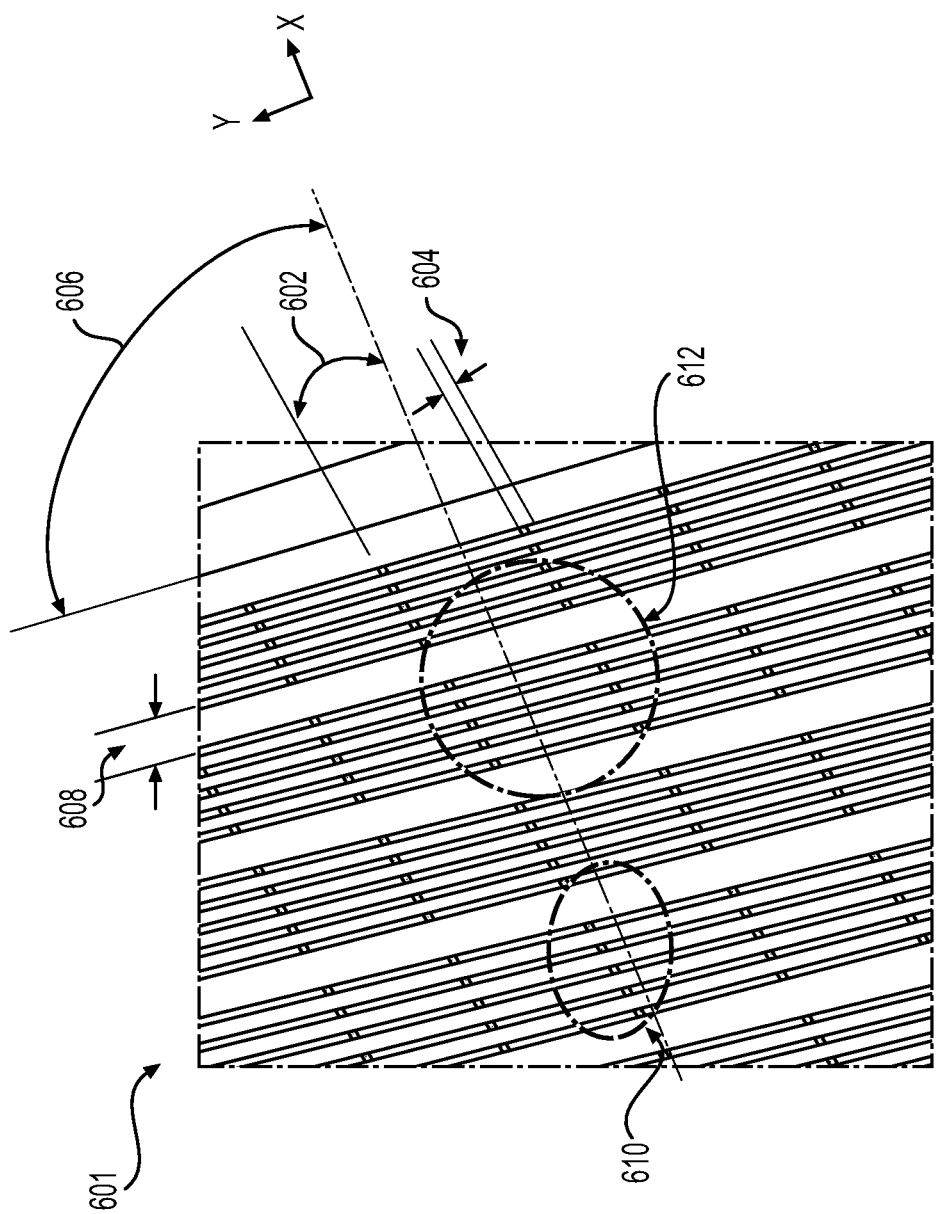
FIG. 6B shows a magnified top perspective view of a portion of the raft according to some embodiments.

FIG. 6B shows a magnified top view of a portion 601 of a raft 502 shown in FIG. 6A. In some embodiments, the raft 502 may include at least an upper layer and a lower layer. The lower layer comprises a plurality of raft segments at a first raft segment angle 602 with each of the plurality of raft segments separated by a first spacing 604. The upper layer includes a plurality of raft segments at a second raft segment angle 606 with each of the plurality of raft segments separated by a second spacing 608. As shown in FIG. 6B, the second raft segment angle 606 may be different from the first raft segment angle 602, and the upper layer may be printed on top of the lower layer. In some embodiments, portions of the plurality of raft segments included in the upper layer may fall into the first spacing 604, thereby forming several "neck" portions 610. In contrast, portions of the plurality of raft segments included in the upper layer that have not fallen into the first spacing 604 may be referred to as "dense" portions 612. Accordingly, the portions of the plurality of raft segments included in the upper layer which have fallen into the first spacing 604 may result in relatively lower density for the raft segments included in the upper layer.

In order to improve the density of raft segments, the raft 502 may comprise consecutive layers with approximately the same raft segment angles. As shown in FIG. 6A, the raft 502 may comprise a first uppermost layer 614 and second upper layer 616 positioned immediately below the first layer 614, where each layer 614, 616 may be formed at the same raft segment angle (the raft segment angle 606 with reference to FIG. 6B), and the plurality of raft segments included in each layer 614, 616 may overlap and may be separated by a spacing 618 (also referred to as the second spacing 608 with reference to FIG. 6B). In some embodiments, the raft segment angle 606 for the first and second layers 614, 616 may be 90 degrees. As shown in FIG. 6A, the portion of the raft 502 with consecutive first and second layers 614, 616 with repeated raft segment angle 616 may decrease the incidence of necks 610, which may increase the raft 502 density, thereby increasing the strength of the raft. That is, forming the consecutive layers with the same raft segment angle, overlapping raft segments, and the same raft spacing may increase the density and strength of raft 502. As shown in the portion 601 of the raft 502 without the first and second layers 614, 616, the density may not be sufficient due to the "neck" portions 610, as described above with reference to FIG. 6B. While two layers are described with reference to FIG. 6A to explain consecutive layers at same raft segment angles, it is understood that the raft 502 may comprise more than two consecutive layers at approximately the same raft segment angles in alternative embodiments. Additionally, while subsets of consecutive layers may be formed with the same raft segment angle, one or more subsets of consecutive layers having a different raft angle segment angle may be formed on top and/or below.

Figure 7B:
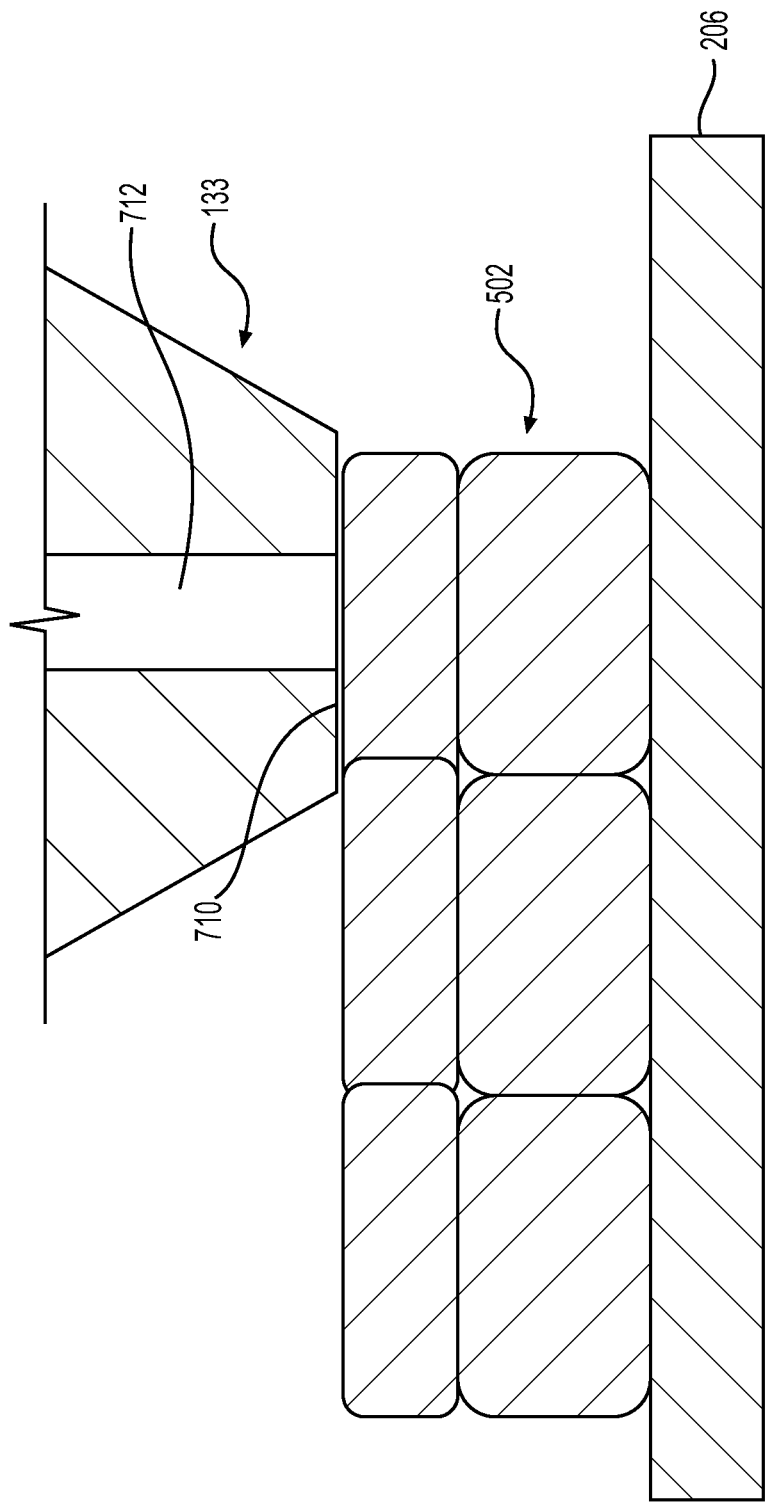
FIG. 7B shows a side view of a portion of a raft relative to a cross-section of a nozzle according to some embodiments.

An exemplary set of parameters for a raft 502 is provided in Table 1 below with reference to FIG. 7A. Table 1 may provide the set of parameters for a 400 μm raft, i.e., a raft comprising extruded beads of 400 μm width, according to one embodiment. In some embodiments, the set of parameters provided in Table 1 may be employed to construct a raft equivalent to the 400 μm raft using a 250 μm nozzle, i.e., a nozzle having an orifice diameter of 250 μm. That is, the nozzle 133 having orifice 712 used to extrude the workable build material may be a nozzle configured to extrude beads of 400 μm width. In some embodiments, the nozzle 133 may include a nozzle flat 710 having a width larger than that of the extruded beads, as shown in FIG. 7B. For example, a nozzle configured to extrude beads having a width that falls between the orifice size of the nozzle and the size of the nozzle flat. Thus, according to the example above, a nozzle for extruding beads of 400 μm width may include a nozzle flat of 650 μm width and a nozzle orifice of 250 μm. The relatively wider nozzle flat may prevent the extruded beads from protruding over the sides of the nozzle, thereby facilitating the formation of extruded beads that have a substantially flat top surface. In the context of the current disclosure, a number within a square bracket shown in Table 1 represents a specific parameter number. For example, [8] indicates the raft top line gap distance (also referred to as the top layer spacing 518), [5] indicates the raft top spacing 702; and [4] indicates the raft top line width 704.

TABLE 1

| Parameter | Name (unit) | Values |
| --- | --- | --- |
| 1 | Raft Top Layers | 18 |
| 2 | Raft Top Layer Thickness (mm) | 0.2 |
| 3 | Raft Top Layer Line Overlap (%) | 92% |
| 4 | Raft Top Line Width (mm) | 0.62 |
| 5 | Raft Top Spacing (mm) | 0.57 |
| 6 | Raft Top Base Span Count | 3 |
| 7 | Raft Top Line Pattern | Dense ZigZag |
| 8 | Raft Top Line Gap Distance (mm) | 1.02 |
| 9 | Raft Top Line Gap Frequency | 5 |
| 10 | Raft Top Line Angles (deg) | [180, 180, 180, 300, 300, 300, 60, 60, 60] |
| 11 | Raft Top Line Shifts | [0, 0, 0, 0, 0, 0, 300, 1300, 1300] |
| 12 | Raft Middle Layers | 1 |
| 13 | Raft Middle Layer Thickness (mm) | 0.27 |
| 14 | Raft Middle Line Width (mm) | 0.62 |
| 15 | Raft Middle Spacing (mm) | 0.57 |
| 16 | Raft Middle Line Pattern | Dense ZigZag |
| 17 | Raft Middle Line Gap Distance (mm) | 1.02 |
| 18 | Raft Middle Gap Frequency | 5 |
| 19 | Raft Middle Line Directions (deg) | [60] |
| 20 | Raft Middle Line Shifts | [1300] |
| 21 | Raft Base Thickness (mm) | 0.35 |
| 22 | Raft Base Line Width (mm) | 0.7 |
| 23 | Raft Base Line Spacing (mm) | 1.1 |

It is understood that parameters provided above in Table 1 refer to an exemplary embodiment of the raft 502, and the parameters may vary in alternative embodiments.

With reference to Table 1, parameters [1]-[11] may apply to the one or more top layers 504 of the raft 502. Parameter number [1] may refer to a number of top layers included in the raft 502, which may determine the height of the raft 502. That is, the number of stacked top layers may determine the height of the raft 502. For example, the raft may include 18 top layers.

Parameter number [2] may refer to a thickness of each of the top layers. For example, each of the top layers may be about 0.2 mm high. In some embodiments, the height of each of the top layers may be about 50% of the diameter of the one or more nozzle 133.

Parameter [3] may refer to a percentage of overlap for top layer lines 516 included in a raft segment 514, which may indicate a density of the top layer line spacing in the raft segment 514. For example, a percentage of overlap provided as less than 1 may indicate that there may be overlap between adjacent top layer lines 516 within the raft segment 514. As another example, a percentage of overlap provided as exceeding 1 may indicate that there may be spacing in between each of the adjacent top layer lines 516 within the raft segment 514.

Parameter [4] may refer to a width 704 of a top layer line 516. In some embodiments, the top layer line width 704, i.e., the extruded bead width, may be no larger than the flat size of the nozzle 133. The top layer line width 704 may be provided such that overfill of the workable build material does not spill or protrude over the sides of the nozzle 133, which may introduce irregularities into a surface of the extruded build material. In some embodiments, the nozzle 133 may be configured to extrude beads of 400 μm and include a nozzle flat of 1 mm width. In some embodiments, the top layer line width 704 may be calculated based on the following equation: $[4]=(([6]-1)*[23]+[22])/(([9]-1)*[3]+1)$, where [6], [9], [22], and [23] indicate parameters which will be described in further detail below.

Parameter [5] may refer to a raft top spacing 702. The raft top spacing 702 may determine overlap between adjacent top layer lines 516. In some embodiments, overlap between adjacent top layer lines 516 may remove macroporosity between the extruded beads that form each line. Pressure resulting from overlap between adjacent top layer lines 516 may be relieved by the raft top line gap distance (also referred to as the top layer spacing 518). In some embodiments, parameter [5] may be calculated based on the following equation: $[5]=[4]*[3]$.

Parameter [6] may refer to the raft top base span count, e.g., a number of parallel lines 510 included in the base layer 504 that the raft segment 514 may span across, as described with reference to FIG. 5A. For example, each of the raft segments 514 included in the top layers may span across three base layer lines 510.

Parameter [7] may refer to a pattern of the lines 516 included in the top layers 506. For example, the lines 516 included in the top layers 502 may be in a zig zag pattern, as shown in FIG. 7A. As another example, the lines 516 included in the top layers 502 may be arranged in a concentric pattern, for example, in concentric annular rings or concentric zig zags arranged. In other examples, lines 516 may be arranged as radial rays, which may radiate out from a central location, or a combination of any of the aforementioned patterns. The patterns (e.g., concentric formations or radial formations) may be centered around or may radiate out from a central location of the top layers 502. In some aspects, this central location may be a center of mass or a center of gravity, or may be a location offset from a center of mass or a center of gravity, e.g., to bias contraction of the raft in a given manner.

Parameter [8] may refer to the raft top line gap distance, e.g., the top layer spacing 518 described herein. That is, parameter [8] may determine the distance between each of the raft segments 514 included in the top layers. For example, the top layer spacing 518 may be configured as 1.02 mm. In some embodiments, the top layer spacing 518 may be calculated based on the following equation: $[8]=[23]-[22]+[4]$.

Parameter [9] may refer to the raft top line gap frequency, e.g., the number of top layer spacing 518 included in a top layer 502. For example, a value of 5 for parameter [9] may indicate that a top layer 506 may include 6 raft segments 514 where each raft segment 514 is separated by one another by the top layer spacing 518, where the top layer 506 includes a total of 5, i.e., the value for parameter [9], top layer spacings 518.

Parameter [10] may refer to the raft segment angle 522 for the top layers 506. In some embodiments, parameter [10] may be configured such that the raft segment angle 522 may be in sets of three. For example, parameter [10] may be configured as [180, 180, 180, 300, 300, 300, 60, 60, 60], where each number indicates a raft segment angle 522 for a top layer 506. In this example, a set of three top layers 506 may each be formed with a raft segment angle 522 of 180 degrees. A subsequent set of three top layers 506 may each be formed with a raft segment angle 522 of 300 degrees. The next set of three top layers 506 may each be formed with a raft segment angle 522 of 60 degrees. The raft segment angle 522 for each subsequent set of three top layers 506 may be different by 120 degrees. In some embodiments, the value provided for parameter [1] may exceed the number of values provided for parameter [10]. In such embodiments, the values provided for parameter [10] may be repeated for the exceeding number of top layers 506. In some embodiments, the number of values provided for parameter [10] may be a half of the value provided for parameter [1]. This may indicate that the raft 502 includes an even distribution of raft segment angles 522. While parameter [10] has been described with reference to set of three layers, it is understood that a set of any number of raft segment angles may be configured in alternative embodiments, e.g., 2, 4, 5, or more.

Parameter [11] may refer to line shifts for the top layer lines 516. In some embodiments, parameter [11] may be configured such that the line 516 in each top layer 506 does not cover and/or block the drainage path 508 throughout the height of the raft 502.

In some embodiments, the raft 502 may include one or more middle layers. In such embodiments, parameters [12]-[20] may apply to the one or more middle layers. The description of the parameters [1]-[11] for the top layers may similarly apply to the middle layer parameters [12]-[20]. In some embodiments, a single middle layer may be included. A middle layer may not be required, but may effectively act as another thick top layer.

Parameters [21]-[23] may apply to one or more base layers 504 of the raft 502. Parameter [21] may refer to a height, i.e., thickness, of a base layer 504. For example, the height of the base layer 504 may be about 0.35 mm. In some embodiments, the height of the base layer 504 may be taller than an expected build surface flatness on which the raft 502 is placed, e.g., to compensate for variations in the build surface flatness, and/or variations in the parallelism of the lines of beads relative to the xy motion plane of the nozzle 133.

Parameter [22] may refer to a width of a line 510 included in the base layer 504. For example, the width of the base layer line 510 may be about 0.7 mm. In some embodiments, the base layer line 510 width may end up larger than what is configured if the one or more nozzles 133 is positioned closer to a build surface than expected.

Parameter [23] may refer to the base layer spacing 512. For example, the base layer spacing 512 may be about 1.1 mm. In some embodiments, the base layer spacing 512 may be calculated as about 1.5 times the value of parameter [22]. This may allow the base layer 504 to absorb variations of the build surface flatness on which the raft 502 is placed and/or in the parallelism of the lines of beads relative to the xy motion plane of the nozzle 133. In some embodiments, the base layer drainage path hole size may be calculated by subtracting the value of parameter [22] from the value of parameter [23]. In some embodiments, a cross section of a top view of the base layer drainage path hole may be in the shape of an equilateral triangle, e.g., an equilateral triangle with 400 um edges, although a drainage path hole may have any suitable shape, whether irregular or regular.

In some embodiments, the raft may comprise a thickness or density that is not uniform. That is, the thickness or density for the raft may be locally increased and/or decreased based, e.g., on properties of the metal part 202 and/or support structures 204a-d positioned directly above a certain section of the raft. For example, a thin portion of the metal part 202 and/or support structures 204a-d may shrink relatively quicker than a thicker portion during a heating process (e.g., a thermal debinding process or a densifying process). Accordingly, the thickness or density for the raft supporting the thin portion of the metal part 202 and/or the support structures 204a-d may be increased to compensate for the relative thinness of these portions of the part. Thus, one or more portions of a raft that underlie a relatively thinner portion of a part may be relatively thicker in order to compensate for the increased rate at which thinner portions of the part may shrink. Accordingly, the raft may be used to offset stress caused by variable shrinkage rates of different portions of the part. In some aspects, edges of a raft may be thicker in order to communicate stress to a central region of the raft.

FIG. 8A depicts a printed object 130 comprising a metal part 202, a raft 802a (also referred to as raft 302 and raft 502 in the embodiments disclosed herein), and a support structure 804a according to some embodiments. The raft 802a may have a relatively constant thickness, which enables a relatively constant shrinkage. The support structure 804a positioned above the raft 802a may be of a lower density than the density of the metal part 202 and the raft 802a. Accordingly, the center of the printed object 130 may have the lowest density, and therefore lowest strength. As such, the center of the printed object 130 may experience large stresses to combat friction associated with the two large masses at both ends of the part 202 as the two large masses shrink toward the center of gravity 808.

In such instances, the raft 802a thickness and/or density may be modified locally in order to more uniformly distribute stresses experienced during shrinkage. For example, the raft 802 thickness and/or density may be locally modified based on local properties of the metal part 202 at any suitable position along the xy plane. Such local properties may include, but are not limited to, a linear density of the metal part 202 along the z-axis, part structure (e.g., a part including small thin features between relatively thicker, heavy masses), or a distance from the center of gravity 808. In some aspects, a raft with variable height may replace the need for a support structure, or may allow for use of a smaller support structure. In some embodiments, outer parameters of the raft 802a may be modified to be relatively thicker such that the outer parameters protrude upwards to partially encompass the metal part 202 and to transfer stress resulting from a heating process towards a central region, e.g., a center of gravity or a center of mass, or a region offset therefrom, of the printed object 130.

Figure 8B:
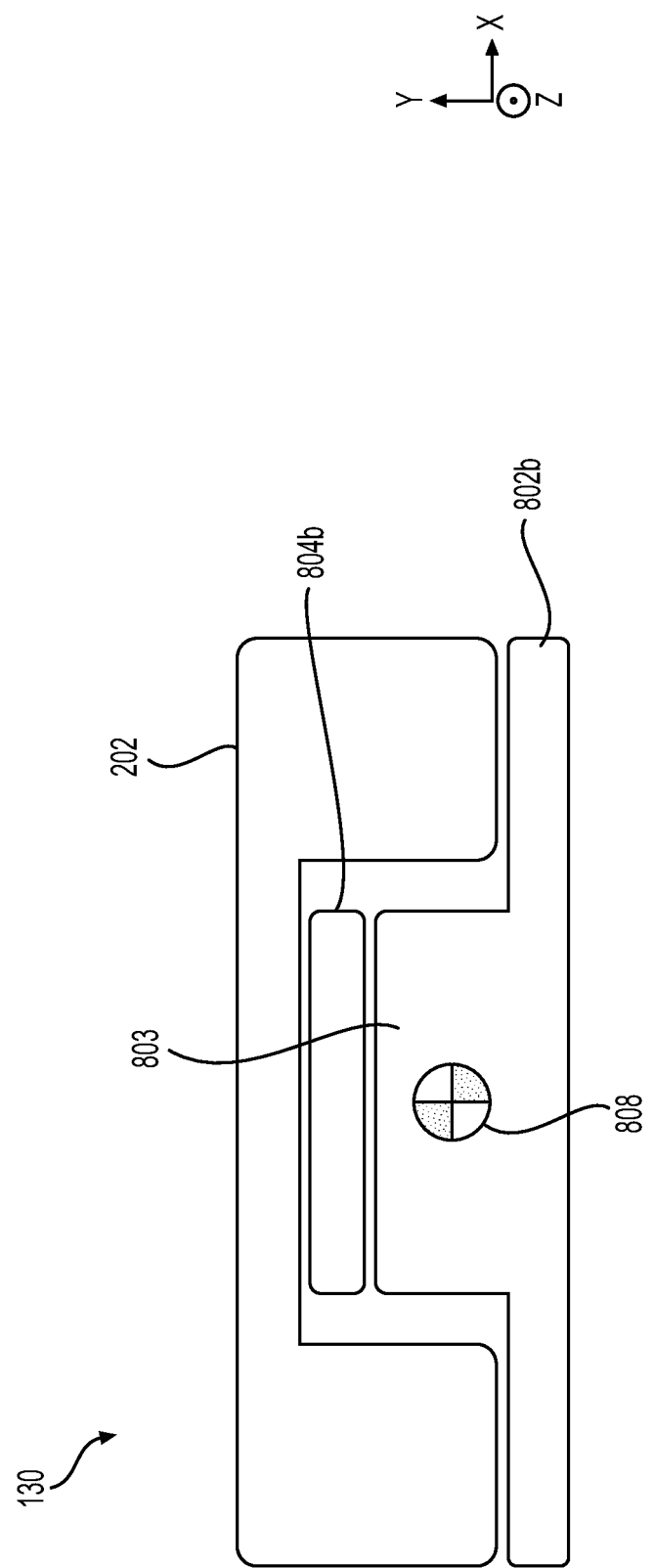
FIG. 8B shows a cross sectional view of a printed object according to some embodiments.

FIG. 8B depicts a raft 802b with variable thickness according to some embodiments. Referring to the example described with reference to FIG. 8A, the center of the printed object 130 may experience large stresses to combat friction associated with the two large masses at both ends of the part 202 as the two large masses shrink toward the center of gravity 808. For example, the thinner center of the printed object 130 may shrink at a faster rate than the thicker end portions of the printed object 130. Accordingly, the raft 802b may comprise a thicker portion 803 in the center which protrudes into the hollow portion of the metal part 202, thereby providing an increased linear density in the raft 802b along the z-axis. The thicker portion 803 of the raft 802b may aid in pulling the two large masses of the metal part 202, which are spaced far away from the center of gravity 808. The thicker portion 803 of the raft 802b may shrink at a slower rate than the relatively thinner portions of the raft 802b underlying the thinner portions of the printed object 130. Pairing relatively thinner and thicker portions of the printed object and the raft may alleviate stress created by different contraction rates between thinner and thicker portions of the printed object. In some embodiments, the printed object 130 may include a support structure 804b in the hollow portion of the metal part 202 and positioned above the thicker portion 803 of the raft 802b. In this way, thicker portion 803 of the raft 802b may at least partially replace a support structure and may allow for a smaller support structure 804b to be used relative to 804a in FIG. 8A. The support structure 804b may be of a lower density than the density of the metal part 202 and the raft 802b.

Figure 8C:
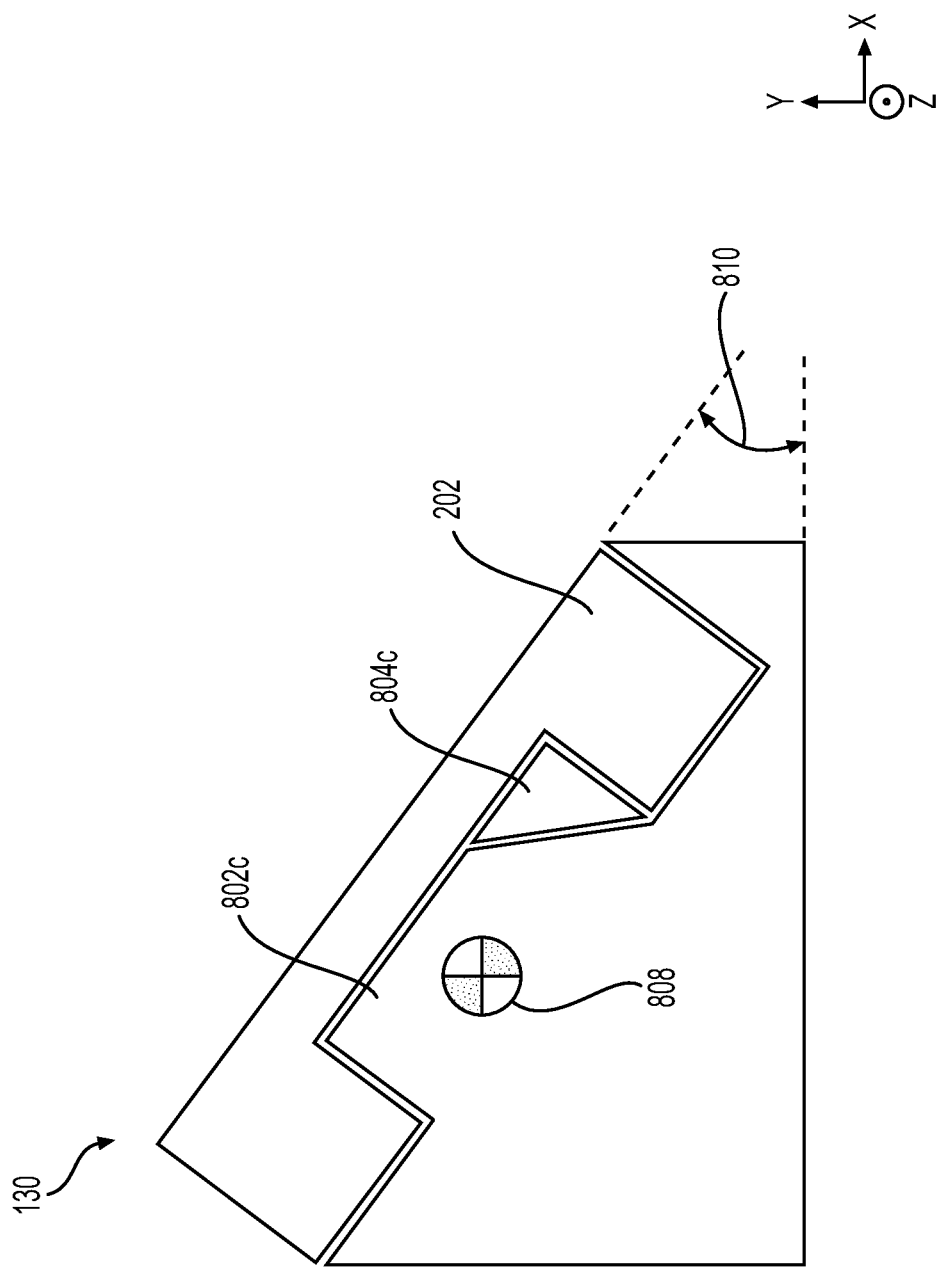
FIG. 8C shows a cross sectional view of a printed object and accompanying build support according to some embodiments.

In some embodiments, the metal part 202 orientation may be modified to shift the x-axis, y-axis, and z-axis (xyz) position of the printed object 130 center of gravity 808 to a centralized location and/or to provide room for the raft thickness to grow or shrink to a desired local thickness, as shown in FIG. 8C. In FIG. 8C, an orientation of the metal part 202 may be configured at an orientation angle 810, e.g., a degrees. In some embodiments, the orientation angle 810 may be nominal, e.g., about 0 degrees. The raft 802c may comprise a thickness that facilitates the orientation of the metal part 202 such that the upper surface of the raft 802c contacts the bottom surface of the metal part 202 and/or the support structure 804c.

The angled orientation of the metal part 202 may provide one or more the following advantages. First, the metal part 202 may shrink down a slope, where gravity may aid the metal part 202 during a thermal processing by reducing the net frictional forces which resist shrinkage, e.g., friction forces between the raft 802c and the metal part 202 at the ceramic separation layer. Second, the mean distance of the components in the printed object 130, e.g., the metal part 202, the support structure 804c, and the raft 802c, may be reduced relative to the center of gravity 808. Reducing distribution of mass relative to the center of gravity 808 may reduce frictional forces. Additionally, room may be provided for the thickness of the raft 802c to be increased. In some embodiments, the raft 802c may fill in the entirety of the hollow portion of the metal part 202 and replace the support structure 804c. In other embodiments, the thickness of the raft 802c may be adjusted such that the raft 802c makes contact with or comes within a predetermined threshold distance from the metal part 202 and/or the support structure 804c.

Further, drainage holes, as described herein, may provide pathways for debinding fluid to debind larger sections of the raft 802c, therefore, although the raft densities may be higher, the debind time may only be limited by denser sections of the raft.

It is to be understood that while the embodiments described above with reference to FIGS. 8A-8C are explained in the context to two-dimensions (2D), the embodiments and related descriptions may apply to three-dimensions (3D), where a raft top surface may have a 3D topology. Further, a smaller orientation angle 810 may be used than what is shown in FIG. 8C. Additionally, it is to be understood that the raft 802a-c may be any combination of the above described embodiments of the raft 302, 502.

FIG. 9 depicts a flow chart of a method of forming an object using additive manufacturing according to some embodiments. As shown in FIG. 9, process 900 may begin with step 902, in which a digital model of the object is received, e.g., by an interface used by a user to input parameters, by a controller, by a processor, and/or by a memory. The digital model may be received, for example, from a database, from a memory, from a user via user input, from a component of an additive manufacturing system, or any other suitable source. As shown in step 904, process 900 may include predicting a shrinking characteristic or receiving a predicted shrinking characteristic of the object that will occur during thermal processing of the object, once formed. As shown in step 906, process 900 may include generating instructions, e.g., printing instructions, and/or a toolpath based on the shrinking characteristic of the object. For example, when slicing of the object to be printed occurs, a slicing file and raft toolpath may be generated using parameters based on the digital model of the object, the shrinking characteristic of the object, and/or any other suitable input parameters.

In some embodiments, step 906 may include generating, based on the shrinking characteristic of the object, instructions for forming a raft on which the object will be formed. In such embodiments, the instructions for forming the raft may be configured to form a raft having a shrinking characteristic that is based on the shrinking characteristic of the object. The instructions for forming the raft may include instructions for forming a multi-layer raft, e.g., as described above, which may include one or more top layers, base layers, and/or middle layers. The instructions for forming the raft may include a toolpath of a print head used to form the raft, and the toolpath may be configured to form one or more layers, e.g., one or more top layers having a plurality of raft segments, as described herein. The toolpath may be configured so that each raft segment generated by a nozzle following the toolpath is spaced apart from an adjacent raft segment, and each raft segment may be made up of a plurality of parallel line segments. In some embodiments, the toolpath may be configured to print the plurality of raft segments of the first of the one or more top layers at a first angle along an x-y plane of the first of the one or more top layers, and the toolpath may be configured to print the plurality of the raft segments of a second of the one or more top layers at a second angle, different than the first angle. In some aspects, the toolpath may be configured to print a plurality of the first of the one or more top layers at the first angle, followed by a plurality of the second of the one or more top layers at the second angle.

In some embodiments, the instructions for forming the raft may include instructions for forming one or more layers of non-sintering ceramic material under the raft or between one or more adjacent layers of the raft. In some embodiments, the instructions for forming the raft may be configured to form one or more drainage paths extending through the raft, e.g., by overlapping spacings between raft segments in adjacent layers of the raft. For example, the instructions for forming the raft may include instructions for forming a base layer and one or more top layers, wherein the base layer and one or more top layers collectively form one or more drainage paths extending through the raft.

In some embodiments, the printing instructions may also include a toolpath for forming a support structure to uphold at least one portion of the object during formation of the object.

In some embodiments, process 900 may further include determining a center of mass or a center of gravity of the object, and generating instructions for forming the raft may include generating a toolpath configured to orient a plurality of strands formed by the toolpath towards, around, or otherwise relative to the center of mass or the center of gravity of the object. In some aspects, process 900 may further include determining at least one of a dimension, a density, or a mass of the object or a dimension, a density, or a mass distribution of the object, where generating instructions for forming the raft is also based on the at least one of the dimension, the density, or the mass of the object or the dimension, the density, or the mass distribution of the object. In some aspects, a thickness of the raft for which instructions are generated may increase as the at least one of the dimension, the density, or the mass of the object or the dimension, the density, or the mass distribution of the object increases or decreases. In other words, the dimension, density, or mass of the entire object may affect the formation of the raft, or the relative dimension, density, or mass distribution of the object may affect the formation of the raft.

In some embodiments, process 900 may further include determining an orientation of the part for formation of the part, and generating instructions for forming the raft may also be based on the orientation of the part for forming the part.

Figure 10A:
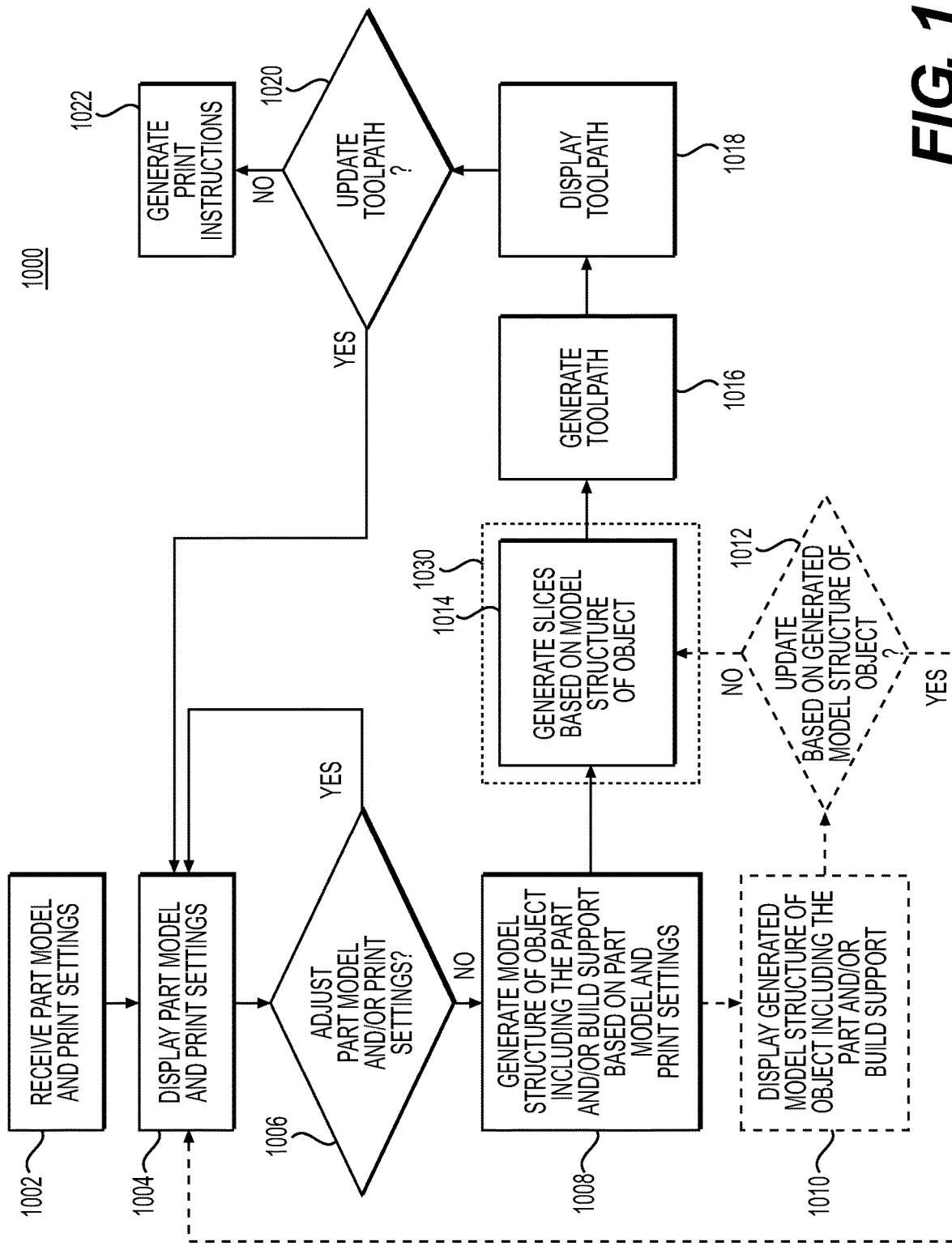
FIG. 10A depicts a flowchart for a method of generating print instructions according to some embodiments.

FIG. 10A depicts a process 1000 of generating an object including a part and one or more build supports according to some embodiments. In some embodiments, the build supports may include a raft and one or more support structures. In some embodiments, the process 1000 may be performed by one or more components of additive manufacturing system 100 depicted in FIG. 1A.

The process 1000 may begin with step 1002, in which a model of the part may be received or determined based on parameters of the part from a user, from a memory, or from other suitable source. In some embodiments, model of the part may be received from a user, from a memory, or from other suitable source. Additionally, manufacture settings (hereinafter referred to as print settings) for the part may be received in step 1002. In some embodiments, the print settings may include configurations for one or more 3D printer(s) or other manufacturing systems, e.g., additive manufacturing system 100 depicted in FIG. 1A. For example, print settings may include default profiles, customized settings (e.g., specified by a user), and/or JavaScript Object Notation (JSON) structure. As another example, print settings may include a print quality for the part (for example, high, medium, or low quality), material for the part, and/or whether fine printing or course printing will be used for the part, etc. As yet another example, print settings may include print speed (e.g., the speed at which beads are extruded from the nozzle 133), bead widths (e.g., the width of the lines of extruded beads), infill, type of infill, layer height (e.g., the height of the lines of extruded beads), etc.

In step 1004, the received part model and print settings are displayed to the user via a user interface, for example, the user interface provided by the additive manufacturing system 100 depicted in FIG. 1A.

In step 1006, it may be possible to adjust one or both of the part model or the print settings, and the changes may be received by the system. For example, a user may adjust one or more part model parameters via the user interface. For example, the user may adjust the part model orientation, part scaling, and/or distortion. In some embodiments, the user may adjust one or more print settings, for example, the user may adjust the print quality, the material, whether fine printing or course printing will be used for the part, print speed, bead widths, infill, infill type, layer height, and/or any other suitable print setting, etc.

If a change has been made to the part model and/or print settings, the process 1000 may repeat to step 1004, in which the updated part model and print settings may be displayed to the user and a user may have an opportunity to again change the settings. If no changes have been made to the part model and/or print settings, the process 1000 may move on to step 1008. In other embodiments, process 1000 may proceed from step 1006 to step 1008, without repeating step 1004, even if a change is input by the user.

In step 1008, a model structure of an object including the part and/or associated build support may be generated in accordance to the part model and print settings displayed in step 1004. In some embodiments, the system may determine one or more build supports, e.g., a raft and one or more support structures, to be formed with the part during manufacturing of the part. For example, one or more support structures may be added to the model to support overhanging structures, etc. The model of the part and associated build supports may collectively be referred to as a model of the object. In some aspects, process 1000 may proceed from step 1008 directly to slicing process 1030, as will be described in further detail below.

In some embodiments, process 1000 may include optional steps 1010 and 1012 (shown as dotted lines in FIG. 10A). In optional step 1010, the generated model structure of the object including the part and/or build support may be displayed to the user, e.g., by a user interface.

In optional step 1012, it may be possible to adjust the part model and/or the print settings based on the generated model structure of the object. In some embodiments, the orientation of the part may be adjusted based on the generated model structure, or one or more generated build supports may be moved or otherwise adjusted. The changes may be made by a user via a user interface and received by the system. If the system receives changes to the part and/or the print settings, the process may move back to step 1008, in which the updated part model and print settings may be displayed to the user, and the steps may be repeated. If it is determined that no changes have been made to the part model and/or print settings, the process 1000 may move on to slicing process 1030. As noted above, steps 1010 and 1012 are optional and may not be performed in some embodiments. Accordingly, the process 1000 may proceed from step 1008 to step 1030.

As shown in FIG. 10A, process 1000 includes slicing process 1030. Slicing process 1030 includes step 1014, in which the model object may be sliced, with each slice corresponding to a cross section of the model structure of the object.

Figure 10B:
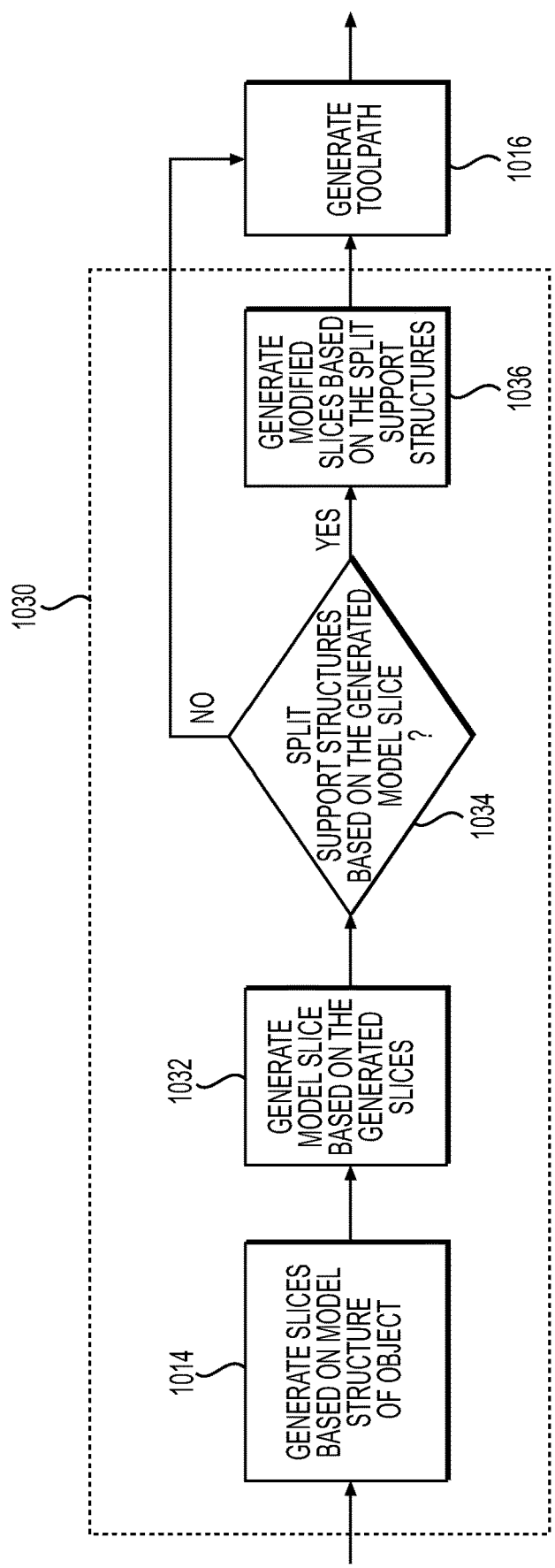
FIG. 10B depicts a flowchart for an optional method of generating slices of a model according to some embodiments.

In some embodiments, slicing process 1030 may further include additional steps 1032, 1034, and/or 1036, as shown in FIG. 10B. In step 1032, a plurality of model slices may be generated based on the plurality of slices generated in step 1014. In step 1034, the model slices may be analyzed to determine whether the one or more support structures need to be split in order to facilitate removal once the object is printed in accordance to the generated slices. For example, if a support structure is generated in step 1008 to support a hollow portion of a model part, and the generated support structure is larger than an opening of the model part that communicates with the hollow portion of the model part, then, after manufacturing the part, a user would not easily be able to remove the support structure from the hollow portion of the part. Accordingly, during step 1034, it may be determined whether one or more support structures should be split into subsections to allow pieces of the support structure to be removed separately.

To provide context for the slicing process 1030, the object may be formed via additive manufacturing by effectively forming each of the plurality of slices on top of another. In instances in which the object includes one or more support structures at least partially encased by the part itself, it may be difficult to remove the one or more support structures once the object has been printed. For example, the part may be a metal tennis ball holder shaped in the form of a tennis ball with an opening wide enough to receive a tennis ball with sufficient applied pressure and configured to hold the tennis ball in place once received. In this example, the object including the part, e.g., the metal tennis ball holder, may also include a support structure in the shape of a tennis ball to provide support for the overhanging portion of the metal tennis ball holder during additive manufacturing. However, once printed, there may be no way of removing the ball-shaped support structure from the part as the ball-shaped support structure does not change form based on applied pressure as would a normal tennis ball. Accordingly, there may be a need to analyze the one or more support structures prior to the actual printing to determine whether the one or more support structures need to be split in order to facilitate removal of the support structures after the object has been printed. The model slices generated in step 1032 may be analyzed to determine whether there is a need to split the one or more support structures to facilitate removal.

In step 1034, it may be determined whether the one or more support structures included in the object need to be split based on the model slices generated in step 1032. Referring back to the tennis ball holder example, the model slices for the object including the metal tennis ball holder and the ball-shaped support structure may be analyzed to determine that the ball-shaped support structure needs to be split in order to remove the ball-shaped support structure from the printed metal tennis ball holder. If it is determined that the one or more support structures included in the object need to be split, the slicing process 1030 may move on to step 1036. In step 1036, a determination regarding how the one or more support structures may be split may be made, and modified slices may be generated based on the split one or more support structures. For example, it may be determined that the ball-shaped support structure may be split into multiple pieces in order to remove the support structure from the opening of the metal tennis ball holder. That is, it may be determined that the ball-shaped support structure should include multiple smaller support structures or support structure sub-portions. Accordingly, a modified plurality of slices may be generated for the metal tennis ball holder based on the metal tennis ball holder and the multiple smaller support structures, as opposed to the metal tennis ball holder and one ball-shaped support structure. While the current disclosure describes an embodiment referring to a metal tennis ball holder, it is understood that modified slices may be generated for any type of part and/or support structures in accordance to the slicing process 1030 described herein. If it is determined that the one or more support structures included in the object may be split, the slicing process 1030 may move on to step 1036. If however, it is determined that the support structures may not need to be split for removal, then the process may proceed from step 1034 to step 1016.

In step 1016, a toolpath of a print head used to form the object may be determined based on the plurality of slices generated through slicing process 1030. For example, the toolpath may be generated based on the plurality of slices from step 1014, from step 1034 once it is determined that splitting support structures is not needed, or based on the modified plurality slices from step 1036. In some embodiments, the toolpath may be generated further based on the print settings. For example, the toolpath may be determined based on a print speed, bead width, and/or infills, etc. In step 1018, the generated toolpath of the print head may be displayed to the user via the user interface, for example, the user interface provided by the additive manufacturing system 100 depicted in FIG. 1A. In some embodiments, the determined toolpath of the print head may be displayed to the user in a similar manner as shown in FIG. 7A. The toolpath of the print head may be inspected for any abnormalities and/or structural deficiencies either automatically or by a user. For example, the toolpath may be inspected for one or more portions of the toolpath that may be too thin or thick for formation, e.g., and may be likely to fail. In other examples, the toolpath may be assessed to determine whether all portions of the part are properly supported or whether a print setting is incompatible with the toolpath.

In step 1020, a user may alter the toolpath, e.g., by altering the part model and/or the print settings. For example, the part model and/or the print settings may be adjusted based on a 3D model of the toolpath displayed to a user in step 1018. If a change is made to the part model and/or the print settings, the process 1000 may proceed back to step 1004, in which the updated part model and print settings may be displayed to the user. If no changes are made to the part model and/or print settings, the process 1000 may move on to step 1022. In step 1022, print instructions may be generated based on the determined toolpath. In some embodiments, the print instructions may be in the form of a G-code file or any other programming language to be executed by one or more 3D printer(s) or other manufacturing systems, e.g., additive manufacturing system 100 depicted in FIG. 1A.

Figure 11:
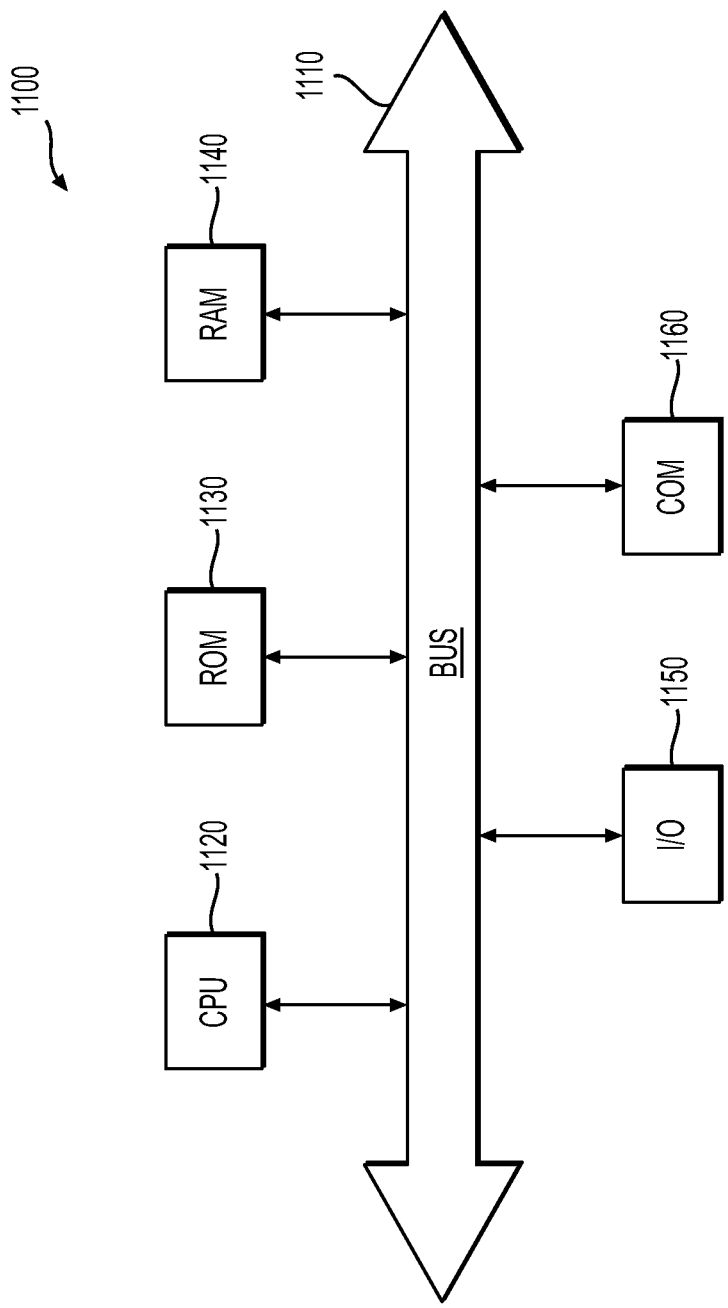
FIG. 11 depicts an exemplary computer device or system, in which embodiments of the present disclosure, or portions thereof, may be implemented.

As shown in FIG. 11, a device 1100 used for performing the various embodiments of the present disclosure (e.g., the controller subsystem 116, the controller 138, and/or any other computer system or user terminal for performing the various embodiments of the present disclosure) may include a central processing unit (CPU) 1120. CPU 1120 may be any type of processor device including, for example, any type of special purpose or general-purpose microprocessor device. As will be appreciated by persons skilled in the relevant art, CPU 1120 also may be a single processor in a multi-core/multiprocessor system, such system operating alone, or in a cluster of computing devices operating in a cluster or a server farm. CPU 1120 may be connected to a data communication infrastructure 1110, for example, a bus, message queue, network, or multi-core message-passing scheme.

A device 1100 (e.g., the controller subsystem 116, the controller 138, and/or any other computer system or user terminal for performing the various embodiments of the present disclosure) may also include a main memory 1140, for example, random access memory (RAM), and may also include a secondary memory 1130. Secondary memory 1130, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example may read from and/or write to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1130 may include other similar means for allowing computer programs or other instructions to be loaded into device 1100. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1100.

A device 1100 may also include a communications interface ("COM") 1160. Communications interface 1160 may allow software and data to be transferred between device 1100 and external devices. Communications interface 1160 may include a modem, a network interface (such as an Ethernet card), a communications port, a PCMCIA slot and card, or the like. Software and data transferred via communications interface 1160 may be in the form of signals, which may be electronic, electromagnetic, optical, or other signals capable of being received by communications interface 1160. These signals may be provided to communications interface 1160 via a communications path of device 1100, which may be implemented using, for example, wire or cable, fiber optics, a phone line, a cellular phone link, an RF link, a wireless connection (e.g., Bluetooth connection, wireless local are network (WLAN) connection, and cellular network connection) or other communications channels.

The hardware elements, operating systems, and programming languages of such equipment are conventional in nature, and it is presumed that those skilled in the art are adequately familiar therewith. A device 1100 also may include input and output ports 1150 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc., are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc., can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software.

It is intended that the specification and examples be considered as exemplary only, with a true scope and spirit of the disclosure being indicated by the following claims.

The invention claimed is:

1. A method of forming an object using additive manufacturing, the method comprising:
   receiving a digital model of the object;
   predicting a shrinking characteristic or receiving a predicted shrinking characteristic of the object that will occur during thermal processing of the object, once formed;
   based on the shrinking characteristic of the object, generating a toolpath for forming a multi-layer raft including a base layer and one or more top layers on which the object will be formed so that a shrinking characteristic of the raft reflects the shrinking characteristic of the object,
   wherein the toolpath is configured to form the base layer at a first raft segment angle in raft segments of a raft segment width separated by a spacing and form the one or more top layers at a second raft segment angle in raft segments of the raft segment width separated by the spacing; and
   additively manufacturing the base layer, the one or more top layers and the object according to the toolpath.

2. The method of claim 1, wherein the toolpath is further configured to form a middle layer.

3. The method of claim 1, wherein the overlapping spacing of the base layer and one or more top layers collectively form one or more drainage paths extending through the raft.

4. The method of claim 1, further comprising determining at least one of a dimension, a density, a mass of the object or a mass distribution of the object, and wherein the toolpath is also generated based on the at least one of the dimension, the density, the mass of the object or the mass distribution of the object.

* * * * *